United States Patent
Richards et al.

(10) Patent No.: US 6,300,903 B1
(45) Date of Patent: *Oct. 9, 2001

(54) SYSTEM AND METHOD FOR PERSON OR OBJECT POSITION LOCATION UTILIZING IMPULSE RADIO

(75) Inventors: James L. Richards, Fayetteville, TN (US); Donald A. Kelly, Niceville, FL (US); James S. Finn, Huntsville, AL (US); David C. Meigs, Huntsville, AL (US); William D. Welch, Jr., Huntsville, AL (US)

(73) Assignee: Time Domain Corporation, Huntsville, AL (US)

( * ) Notice: Subject to any disclaimer, the term of this patent is extended or adjusted under 35 U.S.C. 154(b) by 0 days.

(21) Appl. No.: 09/456,409

(22) Filed: Dec. 8, 1999

Related U.S. Application Data

(63) Continuation-in-part of application No. 09/045,929, filed on Mar. 23, 1998, now Pat. No. 6,133,876.

(51) Int. Cl.[7] ........................................ G01S 3/02
(52) U.S. Cl. .................. 342/450; 342/357.06; 342/457; 342/463
(58) Field of Search ................. 342/357.06, 450, 342/453, 463, 457

(56) References Cited

U.S. PATENT DOCUMENTS

| | | | |
|---|---|---|---|
| 2,716,236 | 8/1955 | Reinish et al. | 343/13 |
| 3,068,473 | 12/1962 | Muth | 343/112 |
| 3,213,449 | 10/1965 | Kobayashi et al. | 343/12 |
| 3,376,504 | 4/1968 | Chick | 324/68 |
| 3,396,393 | 8/1968 | Wagner | 343/14 |
| 3,461,452 | 8/1969 | Welter | 343/12 |
| 3,614,226 | 10/1971 | Vergoz | 356/5 |
| 3,659,292 | 4/1972 | Low et al. | 343/6.5 R |
| 3,680,121 | 7/1972 | Anderson et al. | 343/112 TC |
| 3,687,556 | 8/1972 | Price et al. | 356/152 |
| 3,714,573 | 1/1973 | Grossman | 325/32 |
| 3,714,650 | 1/1973 | Fuller et al. | 342/42 |
| 3,725,920 | 4/1973 | Küpfer et al. | 343/6.5 R |
| 3,757,290 | * 9/1973 | Ross et al. | 340/23 |
| 3,789,410 | 1/1974 | Smith et al. | 343/112 D |
| 3,829,674 | 8/1974 | Joseph | 702/151 |
| 3,886,553 | 5/1975 | Bates | 343/112 R |
| 3,953,856 | 4/1976 | Hammack | 343/112 D |
| 4,114,155 | 9/1978 | Raab | 343/105 R |
| 4,161,730 | 7/1979 | Anderson | 343/6.5 R |
| 4,283,726 | 8/1981 | Spence et al. | 343/112 D |
| 4,315,260 | 2/1982 | Küpfer | 343/7.5 |
| 4,543,580 | 9/1985 | Bent et al. | 343/460 |
| 4,641,317 | 2/1987 | Fullerton | 375/1 |
| 4,704,574 | 11/1987 | Nossen | 324/83 D |
| 4,743,906 | 5/1988 | Fullerton | 342/27 |
| 4,813,057 | 3/1989 | Fullerton | 375/37 |

(List continued on next page.)

FOREIGN PATENT DOCUMENTS

| | | | |
|---|---|---|---|
| 0 676 650 | 10/1995 | (EP) | G01S/13/76 |
| WO 91/13370 | 9/1991 | (WO) | G01S/13/04 |
| WO 96/41432 | 12/1996 | (WO) | H04B/14/02 |
| WO 99/49333 | 9/1999 | (WO) | G01S/13/06 |

OTHER PUBLICATIONS

English Language Translation of EP 0 676 650, 20 pages.

Primary Examiner—Dao Phan
(74) Attorney, Agent, or Firm—Sterne, Kessler, Goldstein & Fox P.L.L.C.

(57) ABSTRACT

A System and Method for Person or Object Position Location Utilizing Impulse Radio, comprising a plurality of reference impulse radios; an object or person to be tracked having a mobile impulse radio associated therewith; an architecture with an associated positioning algorithm associated with said plurality of impulse radio reference radios and said mobile impulse radio; and display means for displaying the position of the person or object whose position is to be determined.

30 Claims, 32 Drawing Sheets

U.S. PATENT DOCUMENTS

| | | | |
|---|---|---|---|
| 4,916,429 | 4/1990 | Hicks et al. | 340/436 |
| 4,916,455 | 4/1990 | Bent et al. | 342/457 |
| 4,979,186 | 12/1990 | Fullerton | 375/23 |
| 5,216,429 | 6/1993 | Nakagawa et al. | 342/45 |
| 5,317,323 | 5/1994 | Kennedy et al. | 342/457 |
| 5,363,108 | 11/1994 | Fullerton | 342/27 |
| 5,497,160 | 3/1996 | Koehler et al. | 342/145 |
| 5,499,029 | 3/1996 | Bashfortl et al. | 342/22 |
| 5,510,800 | 4/1996 | McEwan | 342/387 |
| 5,589,838 | 12/1996 | McEwan | 342/387 |
| 5,661,490 | 8/1997 | McEwan | 342/387 |
| 5,677,927 | 10/1997 | Fullerton et al. | 375/200 |
| 5,687,169 | 11/1997 | Fullerton | 370/324 |
| 5,748,891 | 5/1998 | Fleming et al. | 375/150 |
| 5,809,424 | 9/1998 | Eizenhoefer | 455/456 |
| 5,832,035 | 11/1998 | Fullerton | 375/210 |
| 5,859,612 | 1/1999 | Gilhousen | 342/457 |
| 5,901,633 | 5/1999 | Chan et al. | 92/5 R |
| 5,912,644 | 6/1999 | Wang | 342/457 |
| 5,977,778 | 11/1999 | Chan et al. | 324/635 |
| 6,005,395 | 12/1999 | Chan et al. | 324/635 |
| 6,040,898 | 3/2000 | Mrosik et al. | 356/5.09 |
| 6,054,950 | 4/2000 | Fontana | 342/463 |
| 6,111,536 | 8/2000 | Richards et al. | 342/125 |
| 6,122,602 | 9/2000 | Michalski et al. | 702/159 |
| 6,133,876 | 10/2000 | Fullerton et al. | 342/375 |
| 6,142,059 | 11/2000 | Chan et al. | 92/5 R |

\* cited by examiner

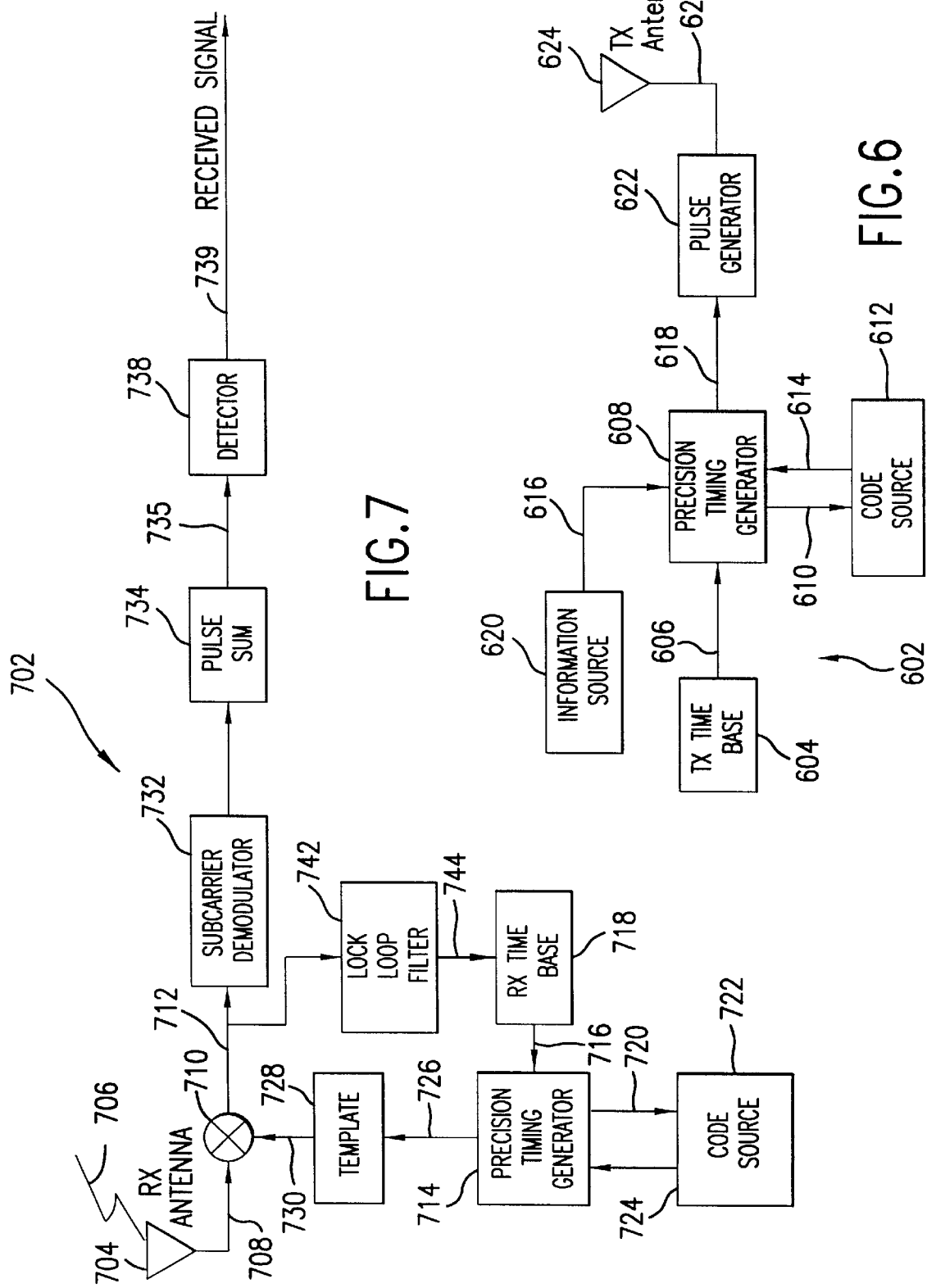

CORRESPONDING
TO EACH
Δt

FOUR NODES IN AN IMPULSE RADIO TDMA LINKED NETWORK

SYSTEM AND METHOD FOR PERSON OR OBJECT POSITION LOCATION UTILIZING IMPULSE RADIO

CROSS-REFERENCE TO RELATED APPLICATIONS

This application is a continuation-in-part of U.S. Non-Provisional Application No. 09/045,929, filed Mar. 23, 1998 now U.S. Pat. No. 6,133,876, entitled "System and Method for Position Determination by Impulse Radio," which is incorporated herein by reference in its entirety.

BACKGROUND OF THE INVENTION

1. Field of the Invention

The present invention relates generally to positioning systems and methods. More particularly, the present invention provides person or object positioning in a predetermined area.

2. Background of the Invention and Related Art

The ability to ascertain the location of an individual or object occurs in countless scenarios. One such scenario includes emergency situations where an emergency worker is in a building wherein potential danger lies. An example of this is a firefighter fighting a fire inside a burning building. It would be very, beneficial and potentially life saving to be able to track the movements and current location of a firefighter inside a burning building. Also, it would be very advantageous to De able to transmit information relating to the person whose location is being tracked and surrounding environment which surrounds them. This would be an example of a scenario wherein the locating area varies.

In the firefighter example, the location would vary depending on where the fire may be located. However, in numerous positioning embodiments the objects or persons whose position is to be determined are located in a fixed area for at least a given period of time. In this scenario the object or person may be moving within a given defined area and its/their position is desired to be located. An example of this may include tracking a prison guard inside of a prison. Danger is inherent in a prison environment and knowing where prison guards are within the confines of a prison is vital. An additional benefit would be to not only be able to know the location of a prison guard, but also to enable the prison guard to communicate on the same device that is tracking his location. Furthermore, the ability to provide an emergency notification would be beneficial. Consequently, if one mobile unit could provide communication, alerting and positioning, the benefits to prison guards would be enormous.

Another example of a person or object moving within a defined area is a child in a theme park such as Disney World in Orlando, Fla. This environment typically includes family members with children. Hundreds of children are lost in Disney World each year as children wander off if the parents turn their head for even a brief period. This can be a very dangerous situation and there is an immense need to be able to find the lost child's exact position immediately. With thousands of people and a large geographic area, this is a difficult task.

Another important task is to know the position of items in a warehouse. Billions of dollars are spent each year on shipping items from one location to another. Many times these items are stored in several locations prior to its arrival at the final destination. In a prior application, filed by the present inventor, application Ser. No. 09/407,106, filed Sep. 27, 1999, entitled "System and Method for Monitoring Assets, Objects, People and Animals Utilizing Impulse Radio", a method of tracking such items utilizing impulse radio was described and is incorporated herein by reference. However, positioning architectures in that application were not used to determine the exact location of items within a warehouse or other area.

Further, numerous other techniques, both completely wireless and partially non-wireless, have been attempted for position locating with limited success. The reason for this limited success is the inherent RF properties of existing technologies. In the burning building example, severe multipath problems exist as well as an extremely noisy RF environment is present. The RF environment is cluttered with emergency radio signals from police and firemen as well as hand held radios from firemen working on the fire. Most buildings are filled with multipath propagation problems and are inherently unreliable in that environment; and a fireman in a burning building is a situation that requires extreme reliability.

In areas such as the Disney World example, attempts have been made to be able to locate people and objects, but again with limited success. The metal rides, the large buildings and many other multipath causing things are present. Thus, a child may be in between two large buildings and under a metal picnic table, cowering in fear for having lost his parents, and conventional radios may not be able to find his position. Further, power and component requirements for conventional wireless technology make placing transmitters with each child problematic due to the size, expense and limited battery life of the transmitters. Therefore, there is a strong need for a wireless position locating system that has advantageous multipath propagation properties, has low transmit power and can be mobile if needed. Also, there is a need for a wireless locating system that, due to it's inherent properties, can be implemented with a large number of varying architectures.

SUMMARY OF THE INVENTION

It is therefore an object of the present invention to provide a position locating system and method utilizing impulse radio techniques.

It is another object of the present invention to provide a position locating system and method utilizing impulse radio that can be mobile or fixed.

It is a further object of the present invention to provide a position locating system and method utilizing impulse radio with the ability to implement a variety of positioning architectures depending on the needs of the system and method.

These and other objects are provided, according to the present invention, by a plurality of impulse radio reference radios; an object or person to be tracked having a mobile impulse radio associated therewith; an architecture with an associated positioning algorithm associated with said plurality of impulse radio reference radios and said mobile impulse radio; and display means for displaying the position of the person or object whose position is to be determined.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 6 illustrates a representative impulse radio transmitter functional diagram;

FIG. 7 illustrates a representative impulse radio receiver functional diagram;

DETAILED DESCRIPTION OF THE EMBODIMENTS

Overview of the Invention

Figure 1A:
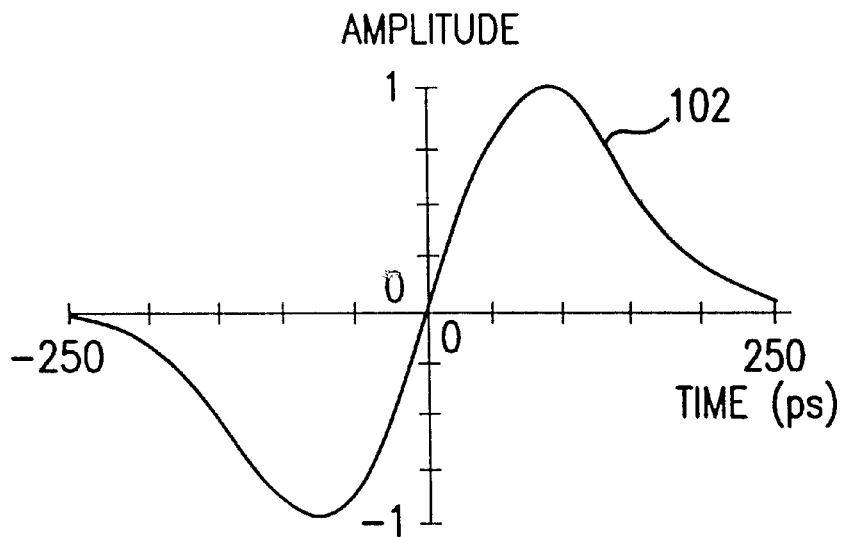
FIG. 1A illustrates a representative Gaussian Monocycle waveform in the time domain.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art. Like numbers refer to like elements throughout.

Recent advances in communications technology have enabled an emerging, revolutionary ultra wideband technology (UWB) called impulse radio communications systems (hereinafter called impulse radio). To better understand the benefits of impulse radio to the present invention, the following review of impulse radio follows. Impulse radio was first fully described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued November 8, 1994) to Larry W. Fullerton. A second generation of impulse radio patents include U.S. Pat. No. 5,677,927 (issued Oct. 14, 1997), U.S. Pat. No. 5,687,169 (issued Nov. 11, 1997) and U.S. Pat. No. 5,832,035 (issued Nov. 3, 1998) to Fullerton et al. These patent documents are incorporated herein by reference.

Uses of impulse radio systems are described in U.S. patent application Ser. No. 09/332,502, entitled, "System and Method for Intrusion Detection Using a Time Domain Radar Array," and U.S. patent application Ser. No. 09/332,503, entitled, "Wide Area Time Domain Radar Array," both filed on Jun. 14, 1999 and both of which are assigned to the assignee of the present invention. These patent documents are incorporated herein by reference.

Impulse Radio Basics

This section is directed to technology basics and provides the reader with an introduction to impulse radio concepts, as well as other relevant aspects of communications theory.

This section includes subsections relating to waveforms, pulse trains, coding for energy smoothing and channelization, modulation, reception and demodulation, interference resistance, processing gain, capacity, multipath and propagation, distance measurement, and qualitative and quantitative characteristics of these concepts. It should be understood that this section is provided to assist the reader with understanding the present invention, and should not be used to limit the scope of the present invention.

Impulse radio refers to a radio system based on short, low duty cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Most waveforms with enough bandwidth approximate a Gaussian shape to a useful degree.

Impulse radio can use many types of modulation, including AM, time shift (also referred to as pulse position) and M-ary versions. The time shift method has simplicity and power output advantages that make it desirable. In this document, the time shift method is used as an illustrative example.

In impulse radio communications, the pulse-to-pulse interval can be varied on a pulse-by-pulse basis by two components: an information component and a pseudo-random code component. Generally, conventional spread spectrum systems make use of pseudo-random codes to spread the normally narrow band information signal over a relatively wide band of frequencies. A conventional spread spectrum receiver correlates these signals to retrieve the original information signal. Unlike conventional spread spectrum systems, the pseudo-random code for impulse radio communications is not necessary for energy spreading because the monocycle pulses themselves have an inherently wide bandwidth. Instead, the pseudo-random code is used for channelization, energy smoothing in the frequency domain, resistance to interference, and reducing the interference potential to nearby receivers.

The impulse radio receiver is typically a direct conversion receiver with a cross correlator front end in which the front end coherently converts an electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternately reverses modulation according to a known pattern at a rate faster than the data rate. This same pattern is used to reverse the process and restore the original data pattern just before detection. This method permits alternating current (AC) coupling of stages, or equivalent signal processing to eliminate direct current (DC) drift and errors from the detection process. This method is described in detail in U.S. Pat. No. 5,677,927 to Fullerton et al.

In impulse radio communications utilizing time shift modulation, each data bit typically time position modulates many pulses of the periodic timing signal. This yields a modulated, coded timing signal that comprises a train of identically shaped pulses for each single data bit. The impulse radio receiver integrates multiple pulses to recover the transmitted information.

Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation.

For system analysis purposes, it is convenient to model the desired waveform in an ideal sense to provide insight into the optimum behavior for detail design guidance. One such waveform model that has been useful is the Gaussian monocycle as shown in FIG. 1A. This waveform is representative of the transmitted pulse produced by a step function into an ultra-wideband antenna. The basic equation normalized to a peak value of 1 is as follows:

$$f_{mono}(t) = \sqrt{e}\left(\frac{t}{\sigma}\right)e^{\frac{-t^2}{2\sigma^2}}$$

Where,
  $\sigma$ is a time scaling parameter,
  t is time,
  fmono(t) is the waveform voltage, and
  e is the natural logarithm base.

Figure 1B:
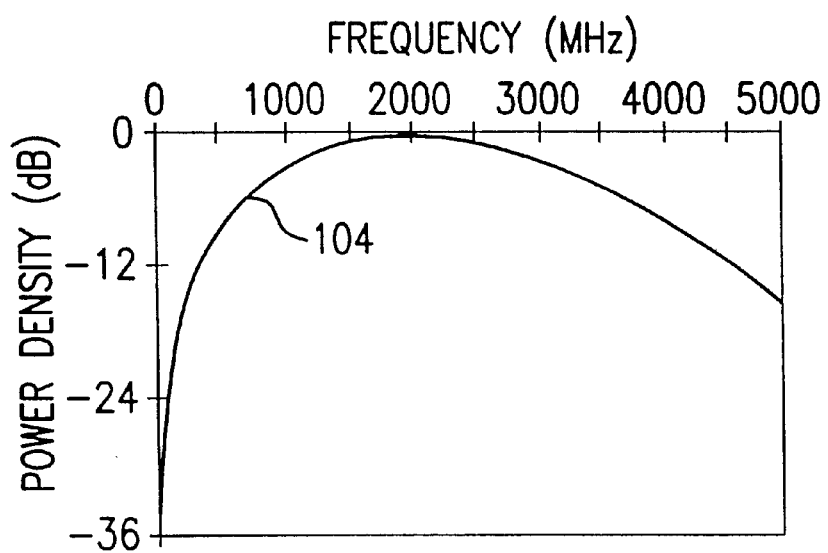
FIG. 1B illustrates the frequency domain amplitude of the Gaussian Monocycle of Fig. 1A.

The frequency domain spectrum of the above waveform is shown in FIG. 1B. The corresponding equation is:

$$F_{mono}(f) = (2\pi)^{\frac{3}{2}}\sigma f e^{-2(\pi\sigma f)^2}$$

The center frequency ($f_c$), or frequency of peak spectral density is:

$$f_c = \frac{1}{2\pi\sigma}$$

These pulses, or bursts of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

A Pulse Train

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Figure 2A:
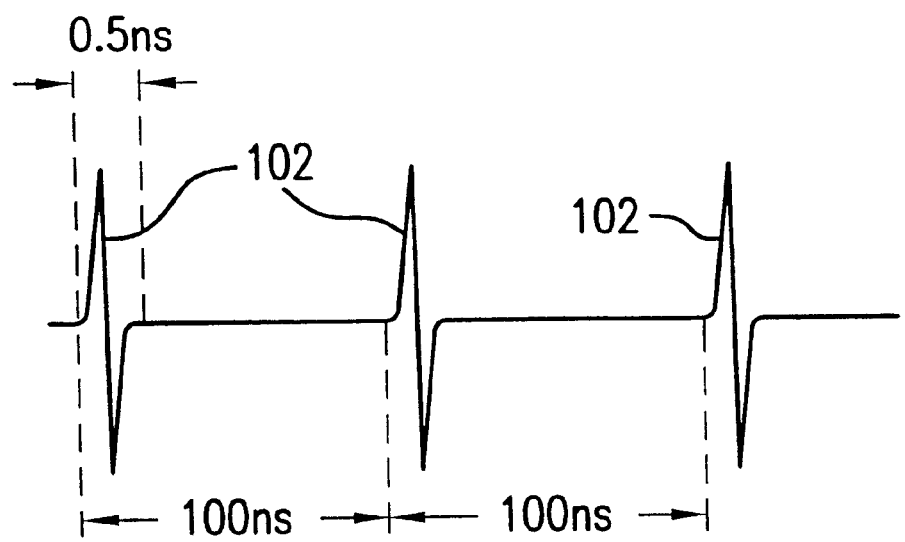
FIG. 2A illustrates a pulse train comprising pulses as in Fig. 1A.
Figure 2B:
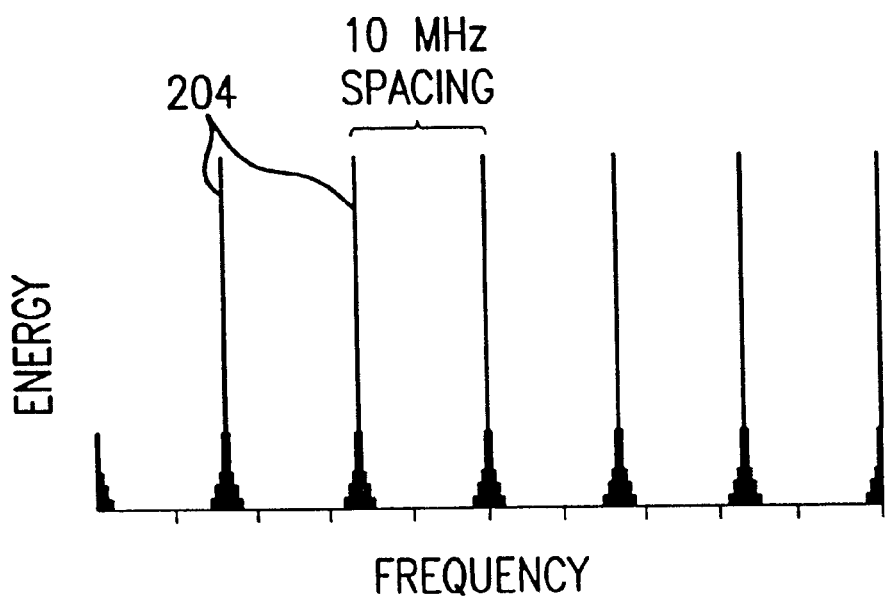
FIG. 2B illustrates the frequency domain amplitude of the waveform of FIG. 2A.

Prototypes built by the inventors have pulse repetition frequencies including 0.7 and 10 megapulses per second (Mpps, where each megapulse is $10^6$ pulses). FIGS. 2A and 2B are illustrations of the output of a typical 10 Mpps system with uncoded, unmodulated, 0.5 nanosecond (ns) pulses 102. FIG. 2A shows a time domain representation of this sequence of pulses 102. FIG. 2B, which shows 60 MHZ at the center of the spectrum for the waveform of FIG. 2A, illustrates that the result of the pulse train in the frequency domain is to produce a spectrum comprising a set of lines 204 spaced at the frequency of the 10 Mpps pulse repetition rate. When the full spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to receiver sharing the band.

It can also be observed from FIG. 2A that impulse radio systems typically have very low average duty cycles resulting in average power significantly lower than peak power. The duty cycle of the signal in the present example is 0.5%, based on a 0.5 ns pulse in a 100 ns interval.

Coding for Energy Smoothing and Channelization

For high pulse rate systems, it may be necessary to more finely spread the spectrum than is achieved by producing comb lines. This may be done by pseudo-randomly positioning each pulse relative to its nominal position.

Figure 3:
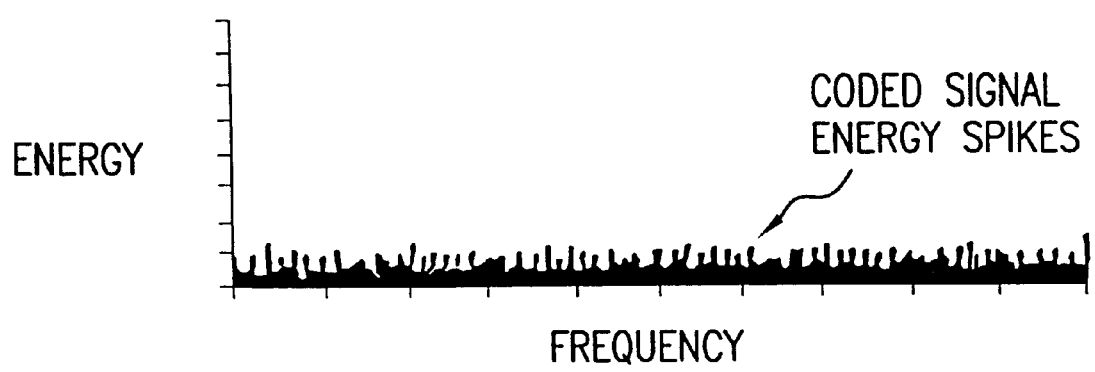
FIG. 3 illustrates the frequency domain amplitude of a sequence of time coded pulses.

FIG. 3 is a plot illustrating the impact of a pseudo-noise (PN) code dither on energy distribution in the frequency domain (A pseudo-noise, or PN code is a set of time positions defining the pseudo-random positioning for each pulse in a sequence of pulses). FIG. 3, when compared to FIG. 2B, shows that the impact of using a PN code is to destroy the comb line structure and spread the energy more uniformly. This structure typically has slight variations which are characteristic of the specific code used.

The PN code also provides a method of establishing independent communication channels using impulse radio. PN codes can be designed to have low cross correlation such that a pulse train using one code will seldom collide on more than one or two pulse positions with a pulses train using another code during any one data bit time. Since a data bit may comprise hundreds of pulses, this represents a substantial attenuation of the unwanted channel.

Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (that is, in addition to PN code dither) in response to the information signal. This amount is typically very small relative to the PN code shift. In a 10 Mpps system with a center frequency of 2 GHz., for example, the PN code may command pulse position variations over a range of 100 ns; whereas, the information modulation may only deviate the pulse position by 150 ps.

Thus, in a. pulse train of n pulses, each pulse is delayed a different amount from its respective time base clock position by an individual code delay amount plus a modulation amount, where n is the number of pulses associated with a given data symbol digital bit.

Modulation further smooths the spectrum, minimizing structure in the resulting spectrum.

Reception and Demodulation

Clearly, if there were a large number of impulse radio users within a confined area, there might be mutual interference. Further, while the PN coding minimizes that interference, as the number of user's rises, the probability of an individual pulse from one user's sequence being received simultaneously with a pulse from another user's sequence increases. Impulse radios are able to perform in these environments, in part, because they do not depend on receiving every pulse. The impulse radio receiver performs a correlating, synchronous receiving function (at the RF level) that uses a statistical sampling and combining of many pulses to recover the transmitted information.

Impulse radio receivers typically integrate from 1 to 1000 or more pulses to yield the demodulated output. The optimal number of pulses over which the receiver integrates is dependent on a number of variables, including pulse rate, bit rate, interference levels, and range.

Interference Resistance

Besides channelization and energy smoothing, the PN coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The PN code helps impulse systems discriminate between the intended impulse transmission and interfering transmissions from others.

Figure 4:
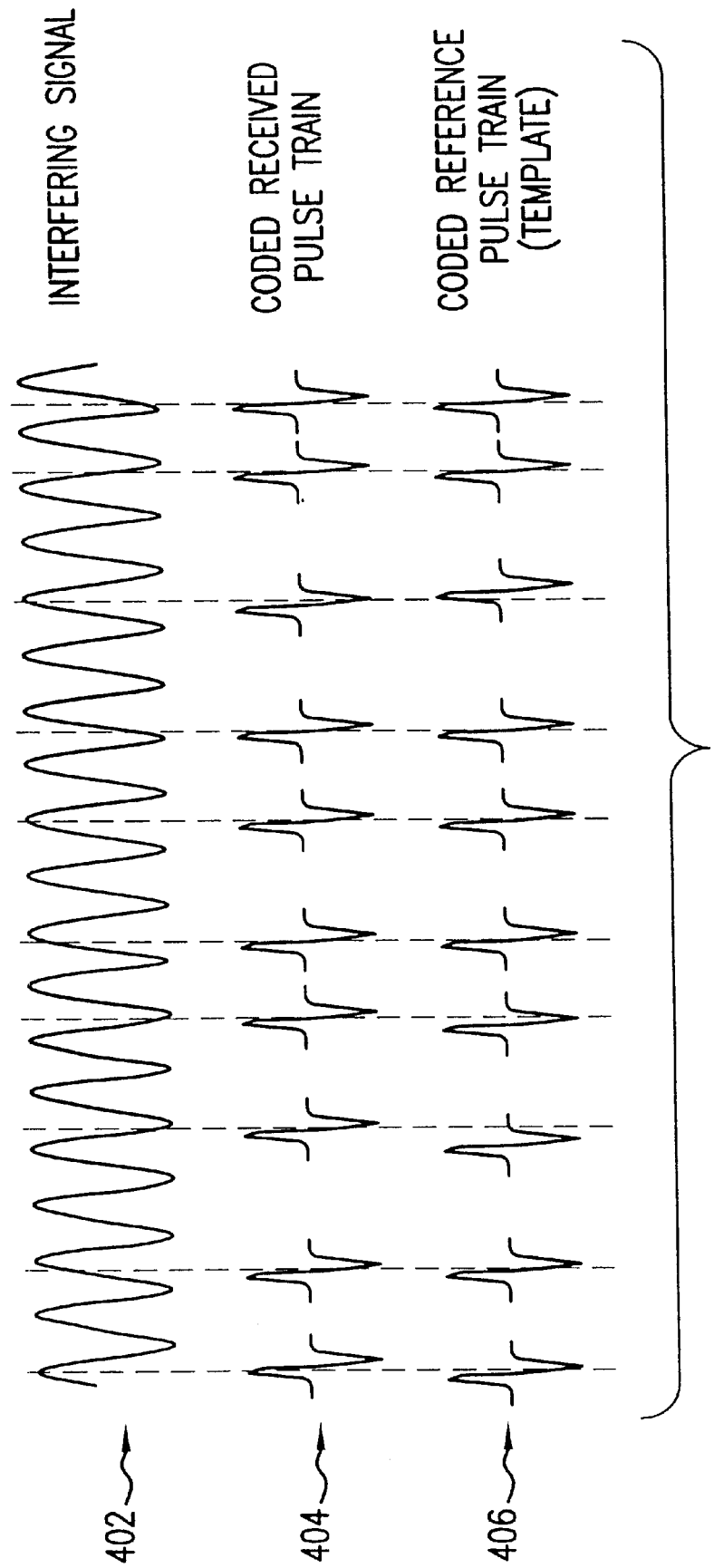
FIG. 4 illustrates a typical received signal and interference signal.

FIG. 4 illustrates the result of a narrow band sinusoidal interference signal 402 overlaying an impulse radio signal 404. At the impulse radio receiver, the input to the cross correlation would include the narrow band signal 402, as well as the received ultrawide-band impulse radio signal 404. The input is sampled by the cross correlator with a PN dithered template signal 406. Without PN coding, the cross correlation would sample the interfering signal 402 with such regularity that the interfering signals could cause significant interference to the impulse radio receiver. However, when the transmitted impulse signal is encoded with the PN code dither (and the impulse radio receiver template signal 406 is synchronized with that identical PN code dither) the correlation samples the interfering signals pseudo-randomly. The samples from the interfering signal add incoherently, increasing roughly according to square root of the number of samples integrated; whereas, the impulse radio samples add coherently, increasing directly according to the number of samples integrated. Thus, integrating over many pulses overcomes the impact of interference.

Processing Gain

Impulse radio is resistant to interference because of its large processing gain. For typical spread spectrum systems, the definition of processing gain, which quantifies the decrease in channel interference when wide-band communications are used, is the ratio of the bandwidth of the channel to the bit rate of the information signal. For example, a direct sequence spread spectrum system with a 10 kHz information bandwidth and a 10 MHZ channel bandwidth yields a processing gain of 1000 or 30 dB. However, far greater processing gains are achieved with impulse radio systems, where for the same 10 KHz information bandwidth is spread across a much greater 2 GHz. channel bandwidth, the theoretical processing gain is 200,000 or 53 dB.

Capacity

It has been shown theoretically, using signal to noise arguments, that thousands of simultaneous voice channels are available to an impulse radio system as a result of the exceptional processing gain, which is due to the exceptionally wide spreading bandwidth.

For a simplistic user distribution, with N interfering users of equal power equidistant from the receiver, the total interference signal to noise ratio as a result of these other users can be described by the following equation:

$$V_{tot}^2 = \frac{N\sigma^2}{\sqrt{Z}}$$

Where
$V^2_{tot}$ is the total interference signal to noise ratio variance, at the receiver;

N is the number of interfering users;

$\sigma^2$ is the signal to noise ratio variance resulting from one of the interfering signals with a single pulse cross correlation; and Z is the number of pulses over which the receiver integrates to recover the modulation.

This relationship suggests that link quality degrades gradually as the number of simultaneous users increases. It also shows the advantage of integration gain. The number of users that can be supported at the same interference level increases by the square root of the number of pulses integrated.

Multipath and Propagation

One of the striking advantages of impulse radio is its resistance to multipath fading effects. Conventional narrow band systems are subject to multipath through the Rayleigh fading process, where the signals from many delayed reflections combine at the receiver antenna according to their seemingly random relative phases. This results in possible summation or possible cancellation, depending on the specific propagation to a given location. This situation occurs where the direct path signal is weak relative to the multipath signals, which represents a major portion of the potential coverage of a radio system. In mobile systems, this results in wild signal strength fluctuations as a function of distance traveled, where the changing mix of multipath signals results in signal strength fluctuations for every few feet of travel.

Impulse radios, however, can be substantially resistant to these effects. Impulses arriving from delayed multipath reflections typically arrive outside of the correlation time and thus can be ignored. This process is described in detail with reference to FIGS. 5A and 5B, In FIG. 5A, three propagation paths are shown. The direct path representing the straight line distance between the transmitter and receiver is the shortest. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

Figure 5A:
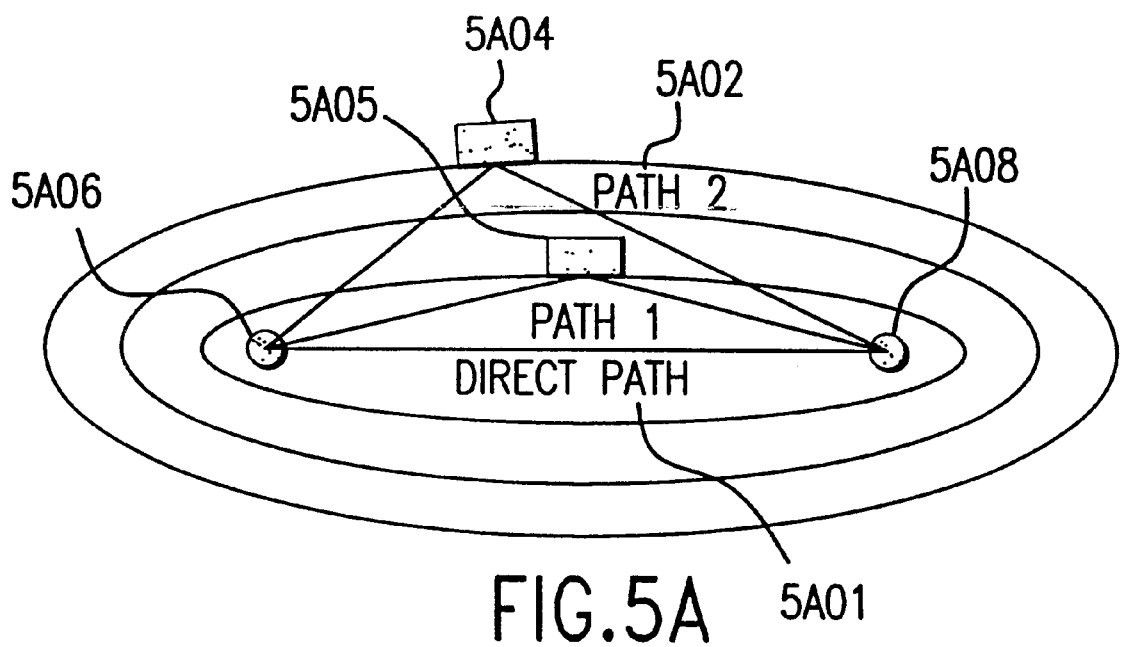
FIG. 5A illustrates a typical geometrical configuration giving rise to multipath received signals.
Figure 5B:
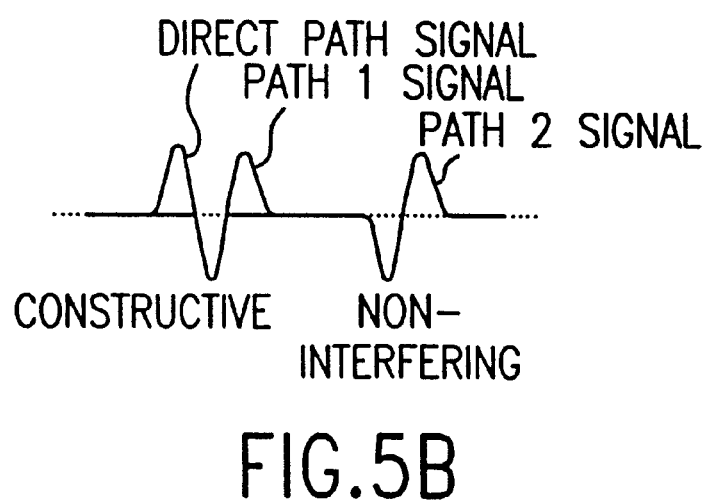
FIG. 5B illustrates exemplary multipath signals in the time domain.

FIG. 5B represents a time domain plot of the received waveform from this multipath propagation configuration. This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the correlator template signal is positioned at the direct path signal, the path 2 signal will produce no response. It can be seen that only the multipath signals resulting from very close reflectors have any effect on the reception of the direct path signal. The multipath signals delayed less than one quarter wave (one quarter wave is about 1.5 inches, or 3.5 cm at 2 GHz center frequency) are the only multipath signals that can attenuate the direct path signal. This region is equivalent to the first Fresnel zone familiar to narrow band systems designers. Impulse radio, however, has no further nulls in the higher Fresnel zones. The ability to avoid the highly variable attenuation from multipath gives impulse radio significant performance advantages.

FIG. 5A illustrates a typical multipath situation, such as in a building, where there are many reflectors 5A04, 5A05 and multiple propagation paths 5A02, 5A01. In this figure, a transmitter TX 5A06 transmits a signal which propagates along the multiple propagation paths 5A02, 5A04 to receiver RX 5A08, where the multiple reflected signals are combined at the antenna.

FIG. 5B illustrates a resulting typical received composite pulse waveform resulting from the multiple reflections and multiple propagation paths 5A01, 5A02. In this figure, the direct path signal 5A01 is shown as the first pulse signal received. The multiple reflected signals ("multipath signals", or "multipath") comprise the remaining response as illustrated.

Figure 5C:
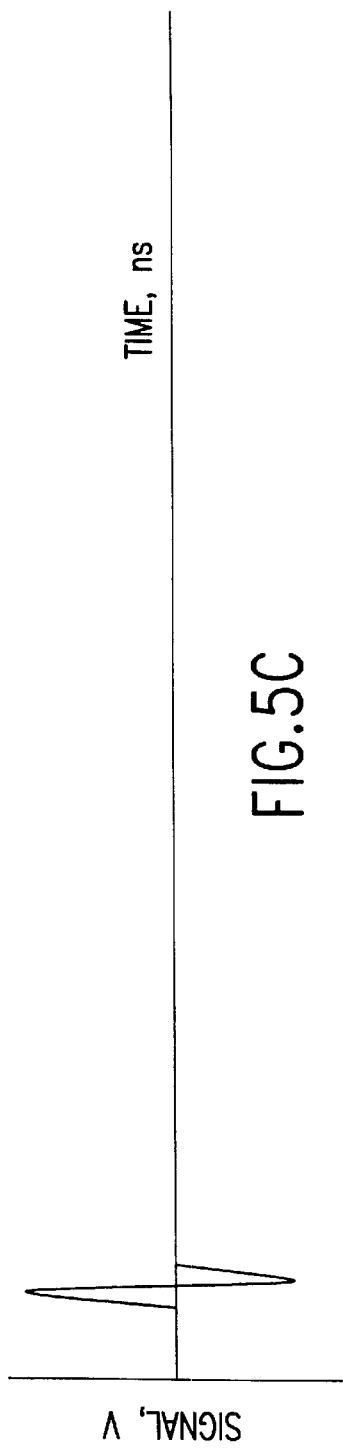
FIGS. 5C–5E illustrate a signal plot of various multipath environments.
Figure 5D:
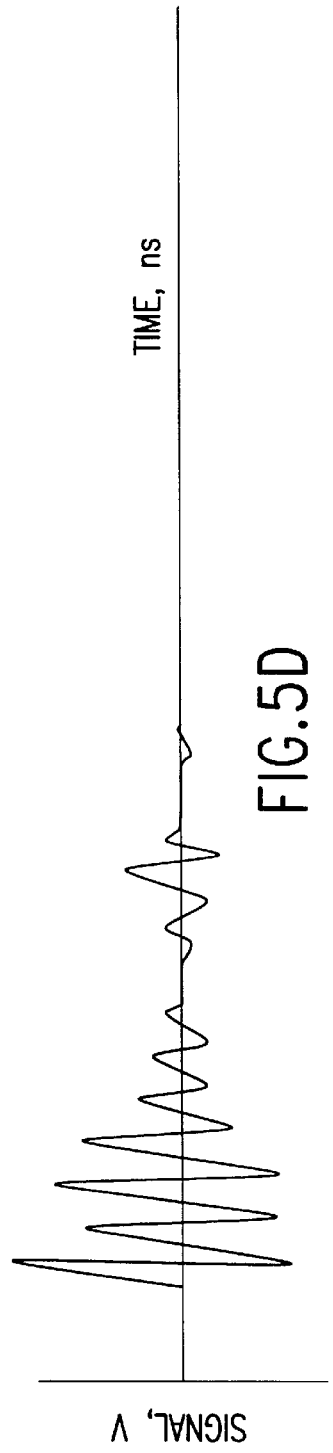
Figure 5E:
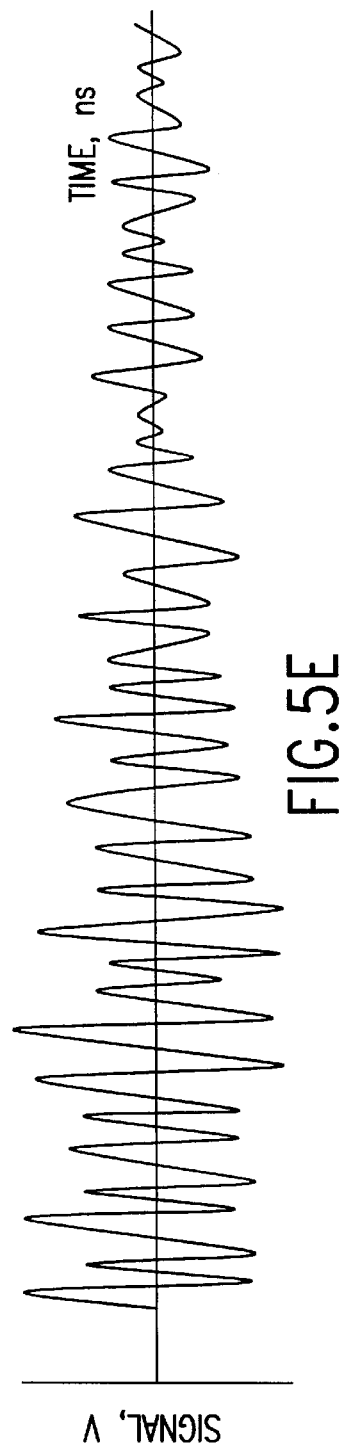

FIGS. 5C, 5D, and 5E represent the received signal from a TM-UWB transmitter in three different multipath environments. These figures are not actual signal plots, but are hand drawn plots approximating typical signal plots. FIG. 5C illustrates the received signal in a very low multipath environment. This may occur in a building where the receiver antenna is in the middle of a room and is one meter from the transmitter. This may also represent signals received from some distance, such as 100 meters, in an open field where there are no objects to produce reflections. In this situation, the predominant pulse is the first received pulse and the multipath reflections are too weak to be significant. FIG. 5D illustrates an intermediate multipath environment. This approximates the response from one room to the next in a building. The amplitude of the direct path signal is less than in FIG. 5C and several reflected signals are of significant amplitude. (Note that the scale has been increased to normalize the plot.) FIG. 5E approximates the response in a severe multipath environment such as: propagation through many rooms; from corner to corner in a building; within a metal cargo hold of a ship; within a metal truck trailer; or within an intermodal shipping container. In this scenario, the main path signal is weaker than in FIG. 5D. (Note that the scale has been increased again to normalize the plot.) In this situation, the direct path signal power is small relative to the total signal power from the reflections.

An impulse radio receiver in accordance with the present invention can receive the signal and demodulate the information using either the direct path signal or any multipath signal peak having sufficient signal to noise ratio. Thus, the impulse radio receiver can select the strongest response from among the many arriving signals. In order for the signals to cancel and produce a null at a given location, dozens of reflections would have to be cancelled simultaneously and precisely while blocking the direct path—a highly unlikely scenario. This time separation of mulitipath signals together with time resolution and selection by the receiver permit a type of time diversity that virtually eliminates cancellation of the signal. In a multiple correlator rake receiver, performance is further improved by collecting the signal power from multiple signal peaks for additional signal to noise performance.

Where the system of FIG. 5A is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{1}{\sigma^2} \exp\left(\frac{-r^2}{2\sigma^2}\right)$$

where r is the envelope amplitude of the combined multipath signals, and $2\sigma^2$ is the RMS power of the combined mulitpath signals.

Figure 5F:
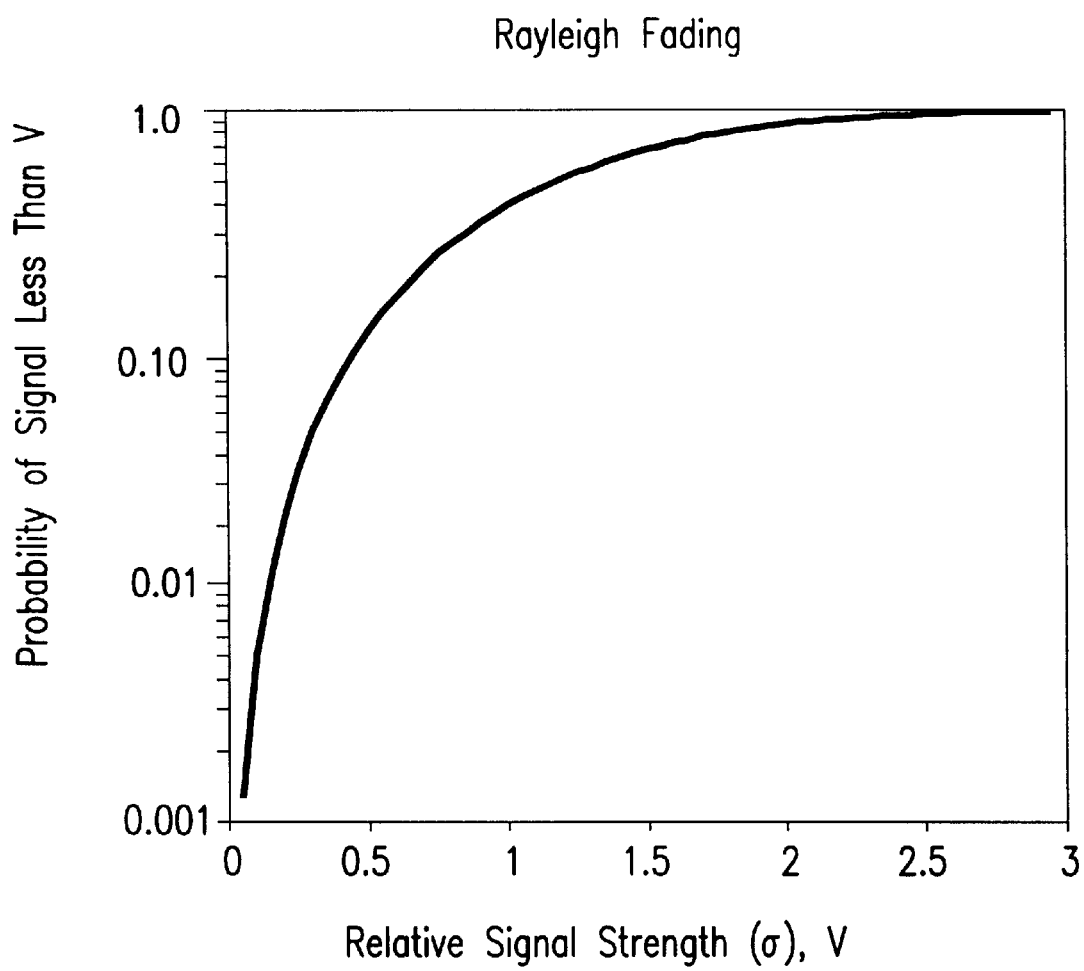
FIGS. 5F illustrates the Rayleigh fading curve associated with non-impulse radio transmissions in a multipath environment.

This distribution shown in FIG. 5F. It can be seen in FIG. 5F that 10% of the time, the signal is more than 16 dB attenuated. This suggests that 16 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

Figure 5G:
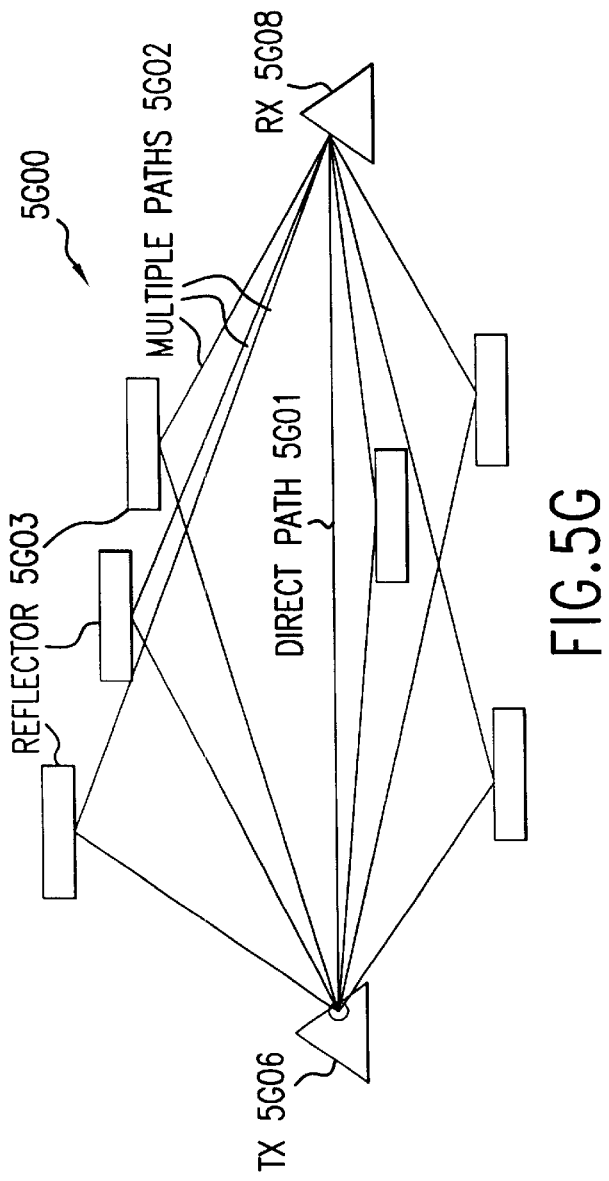
FIG. 5G illustrates a plurality of multipaths with a plurality of reflectors from a transmitter to a receiver.
Figure 5H:
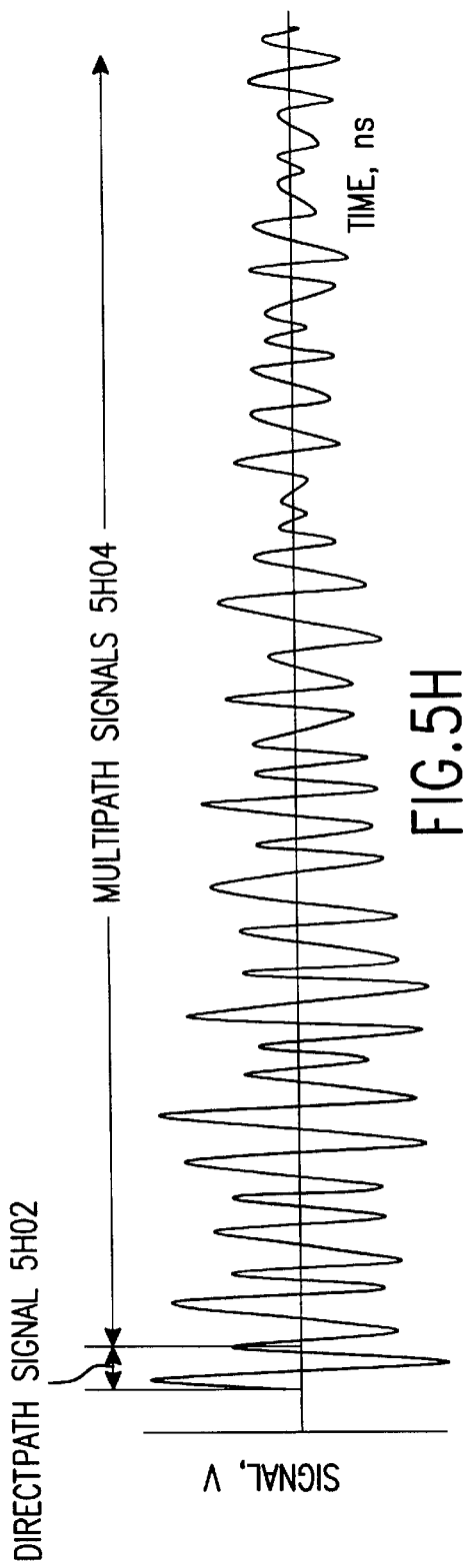
FIG. 5H graphically represents signal strength as volts vs. time in a direct path and multipath environment.

In a high multipath environment such as inside homes, offices, warehouses, automobiles, trailers, shipping containers, or outside in the urban canyon or other situations where the propagation is such that the received signal is primarily scattered energy, impulse radio, according to the present invention, can avoid the Rayleigh fading mechanism that limits performance of narrow band systems. This is illustrated in FIG. 5G and 5H in a transmit and receive system in a high multipath environment 5G00, wherein the transmitter 5G06 transmits to receiver 5G08 with the signals reflecting off reflectors 5G03 which form multipaths 5G02. The direct path is illustrated as 5G01 with the signal graphically illustrated at 5H02, with the vertical axis being the signal strength in volts and horizontal axis representing time in nanoseconds. Multipath signals are graphically illustrated at 5H04.

Distance Measurement

Important for positioning, impulse systems can measure distances to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength—potentially, down to the noise floor of the system. This time position measurement can be used to measure propagation delay to determine link distance, and once link distance is known, to transfer a time reference to an equivalently high degree of precision. The inventors of the present invention have built systems that have shown the potential for centimeter distance resolution, which is equivalent to about 30 ps of time transfer resolution. See, for example, commonly owned, co-pending application Ser. No. 09/045,929, filed Mar. 23, 1998, titled "Ultrawide-Band Position Determination System and Method", and Ser. No. 09/083,993, filed May 26, 1998, titled "System and Method for Distance Measurement by Inphase and Quadrature Signals in a Radio System", both of which are incorporated herein by reference.

In addition to the methods articulated above, impulse radio technology along with Time Division Multiple Access algorithms and Time Domain packet radios can achieve geo-positioning capabilities in a radio network. This geo-positioning method allows ranging to occur within a network of radios without the necessity of a full duplex exchange among every pair of radios.

Figure 9:
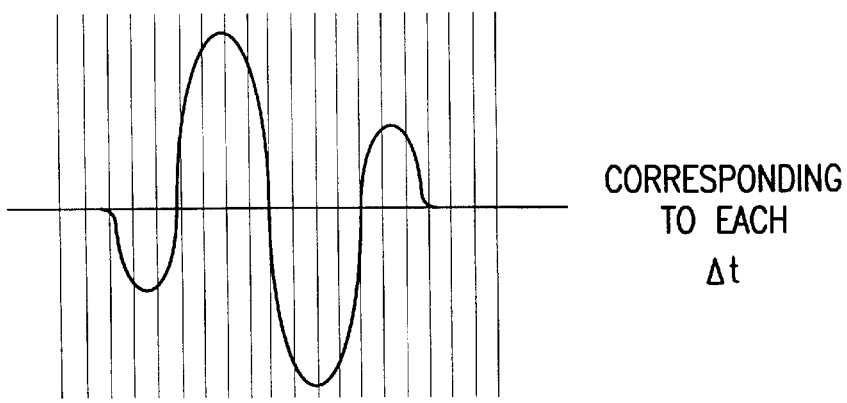
FIG. 9 illustrates the potential locus of results as a function of the various potential template time positions.
Figure 9A:
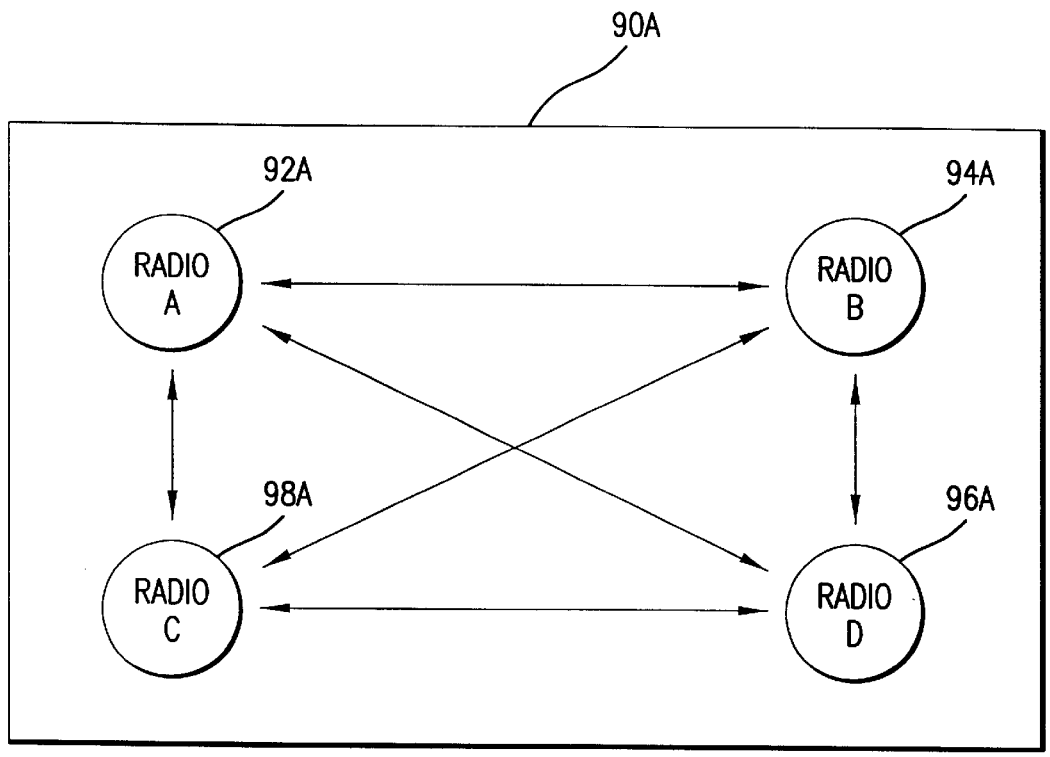
FIG. 9A illustrates four nodes in an Impulse Radio TDMA linked network and the known distances between each node.
Figure 9B:
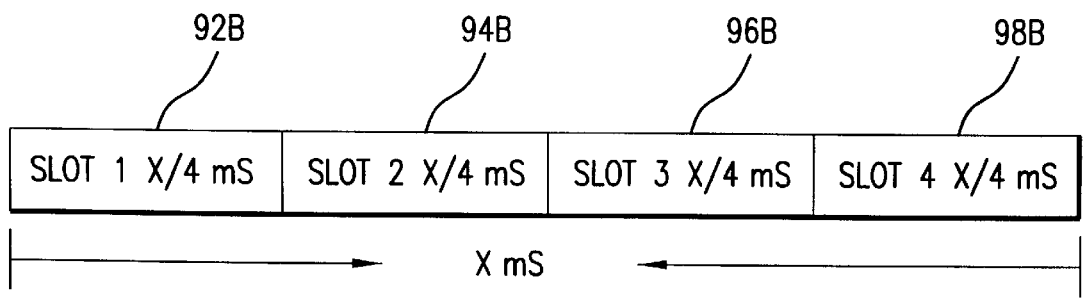
FIG. 9B illustrates the four time slots associated with a four node Impulse Radio TDMA network.

FIG. 9A illustrates an example of a four slot TDMA network 90A. We begin with all radios off the air. As the first radio, 92A, comes on, it pauses to listen to the current network traffic. After a reasonable delay, it powers on and, having heard no other traffic, takes control of the first slot shown in FIG. 9B as 92B. While online, it will periodically send a hello request containing identifying information showing it owns slot 1. Although the network is considered adhoc, the radio that owns the first TDMA slot has some unique responsibilities.

Radio B, 94A, powers up next and begins to listen to network traffic. It notes that Radio A, 92A, is on the air in the first slot. Radio B, 94A, acquires slot 2, 94B, and transmits a hello request at the slot two position 2, 94B. The hello request prompts an exchange with Radio A, 92A, as soon as his slot comes available. Radio A transmits a packet that will result in the acquisition of two pieces of information. Radio A, 92A, sends a SYNC packet containing a request for an immediate acknowledgement. Radio B, 94A, is thereby given permission to respond during Radio A's slot time. Radio B, 94A, transmits a SYNC ACK packet in return. Radio A, 92A, then calculates the distance to Radio B, 94A, and properly adjusts the synchronization clock for the distance and sends the current time, adjusted for distance, to Radio B, 94A. At this point Radio A's, 92A, clock is synchronized with Radio B, 94A. Once this occurs, any time Radio A, 92A, transmits, Radio B, 94A, is capable of calculating the distance to Radio A, 92A, without a full duplex exchange. Also any time Radio B, 94A, transmits, Radio A, 94A, is capable of calculating the distance to Radio B, 94A.

Through periodic SYNC packets to radio C, 98A, and radio D, 96A, on the network, clock synchronization could be maintained throughout the entire network of radios. Assuming that radio A, 92A, radio B, 94A, radio C, 98A and radio D, 96A, al ways transmit packets at the immediate start of their slot times 92B, 94B, 96B, and 98B, this system would allow all radios on a network to immediately calculate the distance to any other radio on the network whenever a radio transmitted a packet.

Exemplary Transceiver Implementation

Transmitter

An exemplary embodiment of an impulse radio transmitter 602 of an impulse radio communication system having one subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614 together with an internally generated subcarrier signal (which is optional) and an information signal 616 to generate a modulated, coded timing signal 618. The code source 612 comprises a storage device such as a random access memory (RAM), read only memory (ROM), or the like, for storing suitable PN codes and for outputting the PN codes as a code signal 614. Alternatively, maximum length shift registers or other computational means can be used to generate the PN codes.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 7, through a propagation medium, such as air, in a radio frequency embodiment. In a preferred embodiment, the emitted signal is wide-band or ultrawide-band, approaching a monocycle pulse as in FIG. 1A. However, the emitted signal can be spectrally modified by filtering of the pulses. This bandpass filtering will cause each monocycle pulse to have more zero crossings (more cycles) in the time domain. In this case, the impulse radio receiver can use a similar waveform as the template signal in the cross correlator for efficient conversion.

Receiver

An exemplary embodiment of an impulse radio receiver (hereinafter called the receiver) for the impulse radio communication system is now described with reference to FIG. 7.

The receiver 702 comprises a receive antenna 704 for receiving a propagated impulse radio signal 706. A received signal 708 is input to a cross correlator or sampler 710 via a receiver transmission line, coupled to the receive antenna 704, and producing a baseband output 712.

The receiver 702 also includes a precision timing generator 714, which receives a periodic timing signal 716 from a receiver time base 718. This time base 718 is adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter to generate the propagated signal. Thus, the timing of the template pulse train matches the timing of the received signal pulse train, allowing the received signal 708 to be synchronously sampled in the correlator 710. The correlator 710 ideally comprises a multiplier followed by a short term integrator to sum the multiplier product over the pulse interval.

The output of the correlator 710 is coupled to a subcarrier demodulator 732, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator is then filtered or integrated in the pulse summation stage 734. A digital system embodiment is shown in FIG. 7. In this digital system, a sample and hold 736 samples the output 735 of the pulse summation stage 734 synchronously with the completion of the summation of a digital bit or symbol. The output of sample and hold 736 is then compared with a nominal zero (or reference) signal output in a detector stage 738 to determine an output signal 739 representing the digital state of the output voltage of sample and hold 736.

The baseband signal 712 is also input to a lowpass filter 742 (also referred to as lock loop filter 742). A control loop comprising the lowpass filter 742, time base 718, precision timing generator 714, template generator 728, and correlator 710 is used to generate an error signal 744. The error signal 744 provides adjustments to the adjustable time base 718 to time position the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

Figure 8A:
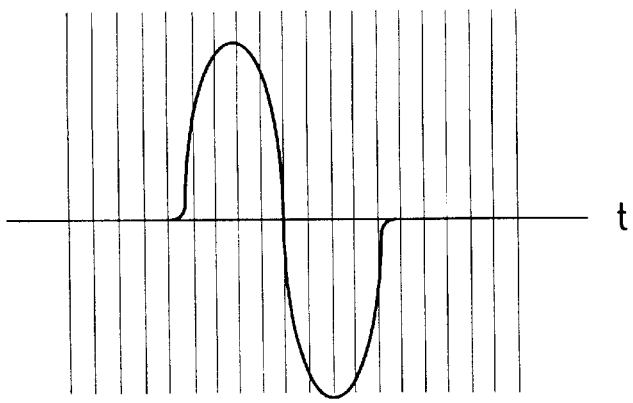
FIG. 8A illustrates a representative received pulse signal at the input to the correlator.
Figure 8B:
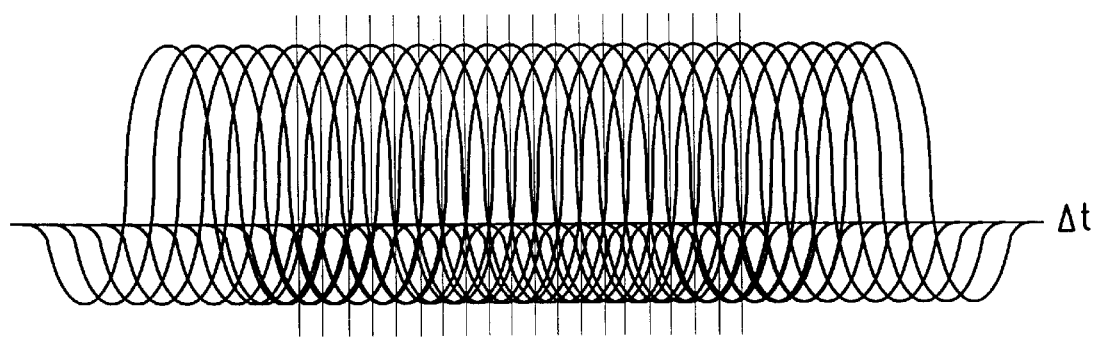
FIG. 8B illustrates a sequence of representative impulse signals in the correlation process.
Figure 10:
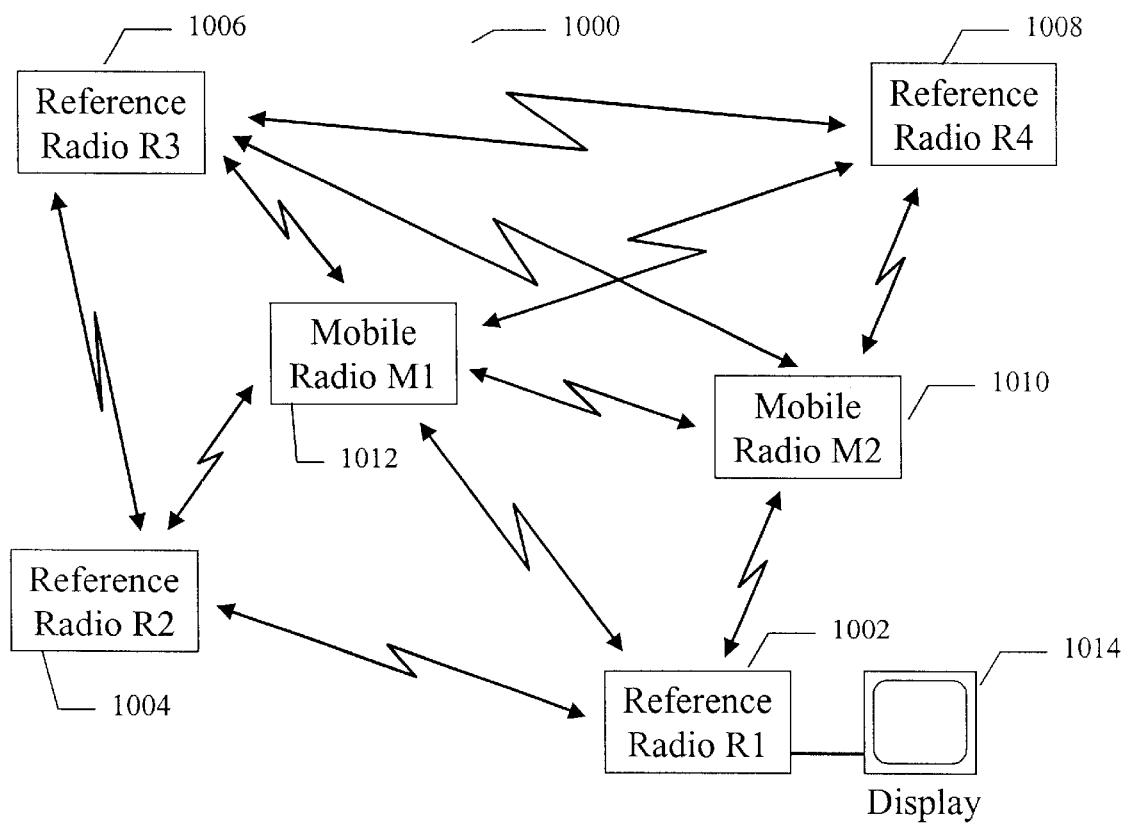
FIG. 10 is an example of a full duplex positioning architecture with synchronized transceiver tracking.

FIGS. 8–10 illustrate the cross correlation process and the correlation function. FIG. 8 shows the waveform of a template signal. FIG. 8B shows the waveform of a received impulse radio signal at a set of several possible time offsets. FIG. 9 represents the output of the correlator (multiplier and short time integrator) for each of the time offsets of FIG. 8B. Thus, this graph does not show a waveform that is a function of time, but rather a function of time-offset. For any given pulse received, there is only one corresponding point which is applicable on this graph. This is the point corresponding to the time offset of the template signal used to receive that pulse. Further examples and details of precision timing can be found described in U.S. Pat. No. 5,677,927, and commonly owned co-pending application Ser. No. 09/146,524, filed Sep. 3, 1998, titled "Precision Timing Generator System and Method", both of which are incorporated herein by reference.

Impulse Radio as Used in the Present Invention

Utilizing the unique properties of impulse radio, the current state of the art in positioning systems is dramatically improved. By using the positioning techniques in the prior impulse radio positioning patents which have been incorporated by reference, as well as the aforementioned novel positioning TDMA technique, in the following architectures, novel impulse radio positioning systems and methods are herein enabled.

Synchronized Transceiver Tracking

FIG. 10 illustrates a Synchronized Transceiver Tracking, wherein a network of fixed-location reference transceivers (two-way impulse radios) allow the position of multiple mobile transceivers (two-way impulse radios) to be determined. This architecture is perhaps the most generic of the impulse radio geo-positioning architectures since both the mobile and reference radios are full two-way transceivers. The network is designed to be scalable, allowing from very few reference and mobile radios to a very large number.

FIG. 10 is a block diagram showing a simple implementation of this architecture. This particular example shows a system of four reference radios (R1, 1002, through R4, 1008) and two mobile radios (M1, 1012, and M2, 1010). The arrows between the radios represent two-way data and/or voice links. A fully inter-connected network would have every radio continually communicating with every other radio, but this is not required and can be dependent upon the needs of the particular application.

Each radio is a two-way transceiver; thus each link between radios is two-way (duplex). Precise ranging information (the distance between two radios) is distributed around the network in such a way as to allow the mobile radios (M1, 1012, and M2, 1010, in FIG. 10) to determine their precise three-dimensional position within a local coordinate system. This position, along with other data or voice traffic, can then be relayed from the mobile radios back to the reference master radio (R1, 1002), one of the other reference relay radios (R2, 1004, through R4, 1008 in FIG. 10), or to other mobile radios such as M2, 1010, in FIG. 10).

The radios used in this architecture are impulse radio two-way transceivers. The reference and mobile radio hardware is essentially the same. The firmware, however, varies slightly based on the functions each radio must perform. For example, R1, 1002, can designate as the reference master radio. As the master, it directs the passing of information and typically will be responsible for collecting all the data for external graphical display. The remaining reference relay radios contain a separate version of the firmware, the primary difference being the different parameters or information that each reference relay radio must provide the network. Finally, the mobile radios have their own firmware version that calculates their position and displays it locally if desired.

In FIG. 10, each radio link is a two-way link that allows for the passing of information, both data and/or voice. The data-rates between each radio link is a function of several variables including the number of pulses integrated to get a single bit, the number of bits per data parameter, the length of any headers required in the messages, the range bin size, and the number of radios in the network.

By transmitting in assigned time slots and by carefully listening to the other radios transmit in their assigned transmit time slots, the entire group of radios within the network, both mobile and reference, will be able to synchronize themselves. The oscillators used on the impulse radio boards will drift slowly in time, thus requiring continual monitoring and adjustment of synchronization. The accuracy of this synchronization process (timing) is dependent upon several factors. These factors include how often and how long each radio transmits.

The purpose of the impulse radio geo-positioning network is to be able to track mobile radios. Tracking is accomplished by stepping through several well-defined steps. The first step is for the reference radios to synchronize together and begin passing information. Then, when a mobile radio enters the network area, it synchronizes itself to the previously synchronized reference radios. Once the mobile radio is synchronized, it begins collecting and time-tagging range measurements from any available reference (or other mobile) radio. The mobile radio then takes these time-tagged ranges and, using a least squares-based or similar estimator, calculates the mobile radio position in local coordinates. If the situation warrants and the conversion possible, the local coordinates can be converted to any one of the worldwide coordinates such as Earth Centered Inertial (ECI), Earth Centered Earth Fixed (ECEF), or J2000 (inertial coordinates fixed to year 2000). Finally, the mobile radio forwards its position solution to the reference master radio for storage and real-time display.

Unsynchronized Transceiver Tracking

Figure 11:
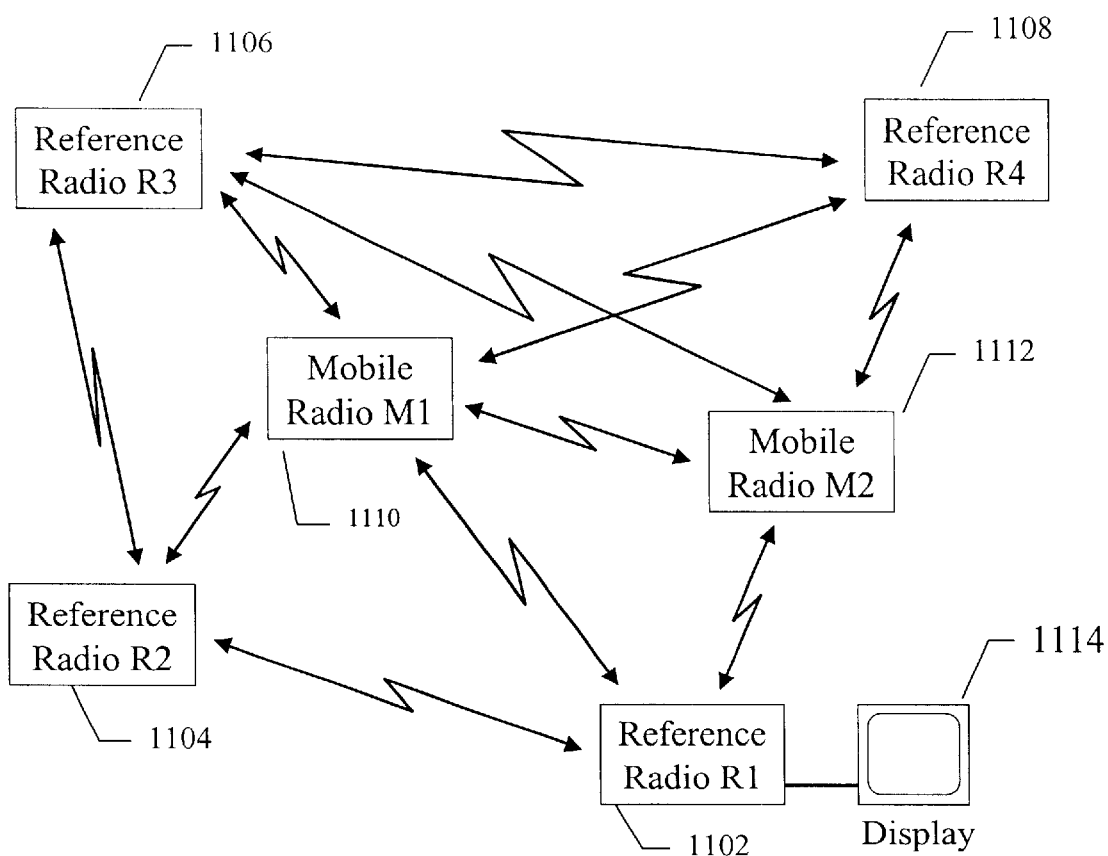
FIG. 11 is an example of a full duplex positioning architecture with unsynchronized transceiver tracking.

FIG. 11 illustrates Unsynchronized Transceiver Tracking, which is a network of fixed-location, unsynchronized reference impulse radio transceivers, 1102–1108, which allows the position of multiple mobile impulse radio transceivers, 1110 and 1112, to be determined. This architecture is similar to Synchronized Transceiver Tracking of FIG. 10, except that the reference receivers are not time-synchronized. Both the mobile and reference radios for this architecture are full two-way transceivers. The network is designed to be scalable, allowing from very few reference and mobile radios to a very large number of both.

This particular embodiment of FIG. 11 shows a system of four reference radios (R1, 1102 through R4, 1108) and two mobile radios (M1, 1110 and M2, 1112). The arrows between the radios represent two-way data and/or voice links. A fully inter-connected network would have every radio continually communicating with every other radio, but this is not required and can be defined as to the needs of the particular application. Each radio is a two-way transceiver; thus each link between radios is two-way (duplex). Precise ranging information (the distance between two radios) is distributed around the network in such a way as to allow the mobile radios (M1, 1110 and M2, 1112 in FIG. 11) to determine their precise three-dimensional position within a local coordinate system. This position, along with other data or voice traffic, can then be relayed from the mobile radios back to the reference master radio (R1, 1102), one of the other reference relay radios (R2, 1104 through RN), or to other mobile radios.

The radios used in the architecture of FIG. 11 are impulse radio two-way transceivers. The reference and mobile radio hardware is essentially the same. The firmware, however, varies slightly based on the functions each radio must perform. For example, R1, 1102, is designated as the reference master radio. It directs the passing of information, and typically will be responsible for collecting all the data for external graphical display. The remaining reference relay radios contain a separate version of the firmware, the primary difference being the different parameters or information that each reference relay radio must provide the network. Finally, the mobile radios have their own firmware version that calculates their position and displays it locally, if desired.

Each radio link is a two-way link that allows for the passing of information, data and/or voice. The data-rates between each radio link is a function of several variables including the number of pulses integrated to get a single bit, the number of bits per data parameter, the length of any headers required in the messages, the range bin size, and the number of radios in the network.

Unlike the radios in the Synchronized Transceiver Tracking architecture, the reference radios in this architecture are not time-synchronized as a network. These radios simply operate independently (free-running), providing ranges to the mobile radios either periodically, randomly, or when tasked. Depending upon the application and situation, the reference radios may or may not talk to other reference radios in the network.

As with the architecture of FIG. 10, the purpose of the impulse radio geo-positioning network is to be able to track mobile radios. Tracking is accomplished by stepping through several steps. These steps are dependent upon the way in which the reference radios range with the mobile radios (periodically, randomly, or when tasked). When a mobile radio enters the network area, it either listens for reference radios to broadcasts, then responds, or it queries (tasks) the desired reference radios to respond. The mobile radio begins collecting and time-tagging range measurements from reference (or other mobile) radios. The mobile radio then takes these time-tagged ranges and, using a least squares-based or similar estimator, calculates the mobile radio position in local coordinates. If the situation warrants and the conversion possible, the local coordinates can be converted to any one of the worldwide coordinates such as Earth Centered Inertial (ECI), Earth Centered Earth Fixed (ECEF), or J2000 (inertial coordinates fixed to year 2000). Finally, the mobile radio forwards its position solution to the reference master radio for storage and real-time display if desired, 1114.

Synchronized Transmitter Tracking

In Synchronized Transmitter Tracking, a network of fixed-location two way reference impulse radio transceivers allow the position of multiple mobile impulse radio transmitters to be determined. This architecture is perhaps the simplest of the impulse radio geo-positioning architectures, from the point-of-view of the mobile radio, since the mobile radios simply transmits in a free-running sense. The network is designed to be scalable, allowing from very few reference and mobile radios to a very large number. This architecture is especially applicable to an "RF tag" (radio frequency tag) type of application.

Figure 12:
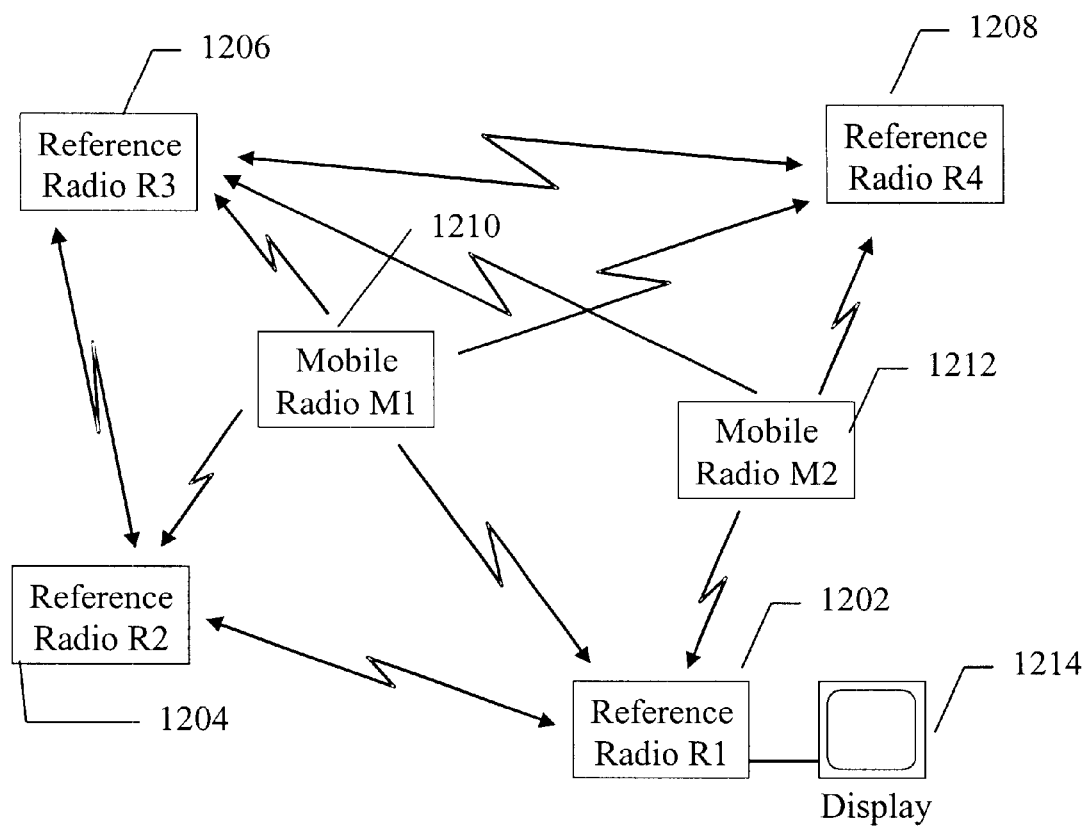
FIG. 12 is an example of a transmitter positioning architecture with synchronized transmitter tracking.

FIG. 12 is a block diagram showing a simple implementation of this architecture. This particular example shows a system of four reference radios (R1,1202 through R4, 1208) and two mobile radios (M1,1210 and M2, 1212). The arrows between the radios represent two-way and one-way data and/or voice links. Notice that the mobile impulse radios only transmit, thus they do not receive the transmissions from the other mobile radios.

Each reference radio is a two-way transceiver; thus each link between reference radios is two-way (duplex). Precise ranging information (the distance between two radios) is distributed around the reference radio network in such a way as to allow the synchronized reference radios to receive the mobile radio transmissions (M1 and M2 in FIG. 1) in order to determine the mobile radio precise three-dimensional position within a local coordinate system. This position, along with other data or voice traffic, can then be relayed from the reference relay radios back to the reference master radio (R1).

The reference radios used in this architecture are impulse radio two-way transceivers, the mobile impulse radios are one-way transmitters. The firmware in the radios varies slightly based on the functions each radio must perform. For example, R1, 1202, is designated as the reference master radio. It directs the passing of information, and typically will be responsible for collecting all the data for external graphical display. The remaining reference relay radios contain a separate version of the firmware, the primary difference being the different parameters or information that each reference relay radio must provide the network. Finally, the mobile radios have their own firmware version that transmits pulses in predetermined sequences.

Each reference radio link is a two-way link that allows for the passing of information, data and/or voice. The data-rates between each radio link is a function of several variables including the number of pulses integrated to get a single bit, the number of bits per data parameter, the length of any headers required in the messages, the range bin size, and the number of radios in the network.

By transmitting in assigned time slots and by carefully listening to the other radios transmit in their assigned transmit time slots, the entire group of reference radios within the network will be able to synchronize themselves. The oscillators used on the impulse radio boards will drift slowly in time, thus requiring continual monitoring and adjustment of synchronization. The accuracy of this synchronization process (timing) is dependent upon several factors. These factors include how often and how long each radio transmits along with other factors. The mobile radios, since they are transmit-only transmitters, are not time-synchronized to the synchronized reference radio network.

The purpose of the impulse radio geo-positioning network is to be able to track mobile radios. Tracking is accomplished by stepping through several well-defined steps. The first step is for the reference radios to synchronize together and begin passing information. Then, when a mobile radio enters the network area and begins to transmit pulses, the reference radios pick up these pulses as time-of-arrivals (TOAs). Multiple TOAs collected by different synchronized reference radios are then converted to ranges, which are then used to calculate mobile radio XYZ position in local coordinates. If the situation warrants and the conversion possible, the local coordinates can be converted to any one of the worldwide coordinates such as Earth Centered Inertial (ECI), Earth Centered Earth Fixed (ECEF), or J2000 (inertial coordinates fixed to year 2000).

Unsynchronized Transmitter Tracking

In Unsynchronized Transmitter Tracking, a network of fixed-location impulse radio reference transceivers allow the position of multiple mobile impulse radio transmitters to be determined. This architecture is very similar to the Synchronized Transmitter Tracking architecture except that the reference radios are not synchronized in time. In other words, both the reference radios and the mobile radios are free-running. The network is designed to be scalable, allowing from very few reference and mobile radios to a very large number. This architecture is especially applicable to an "RF tag" type of application.

Figure 13:
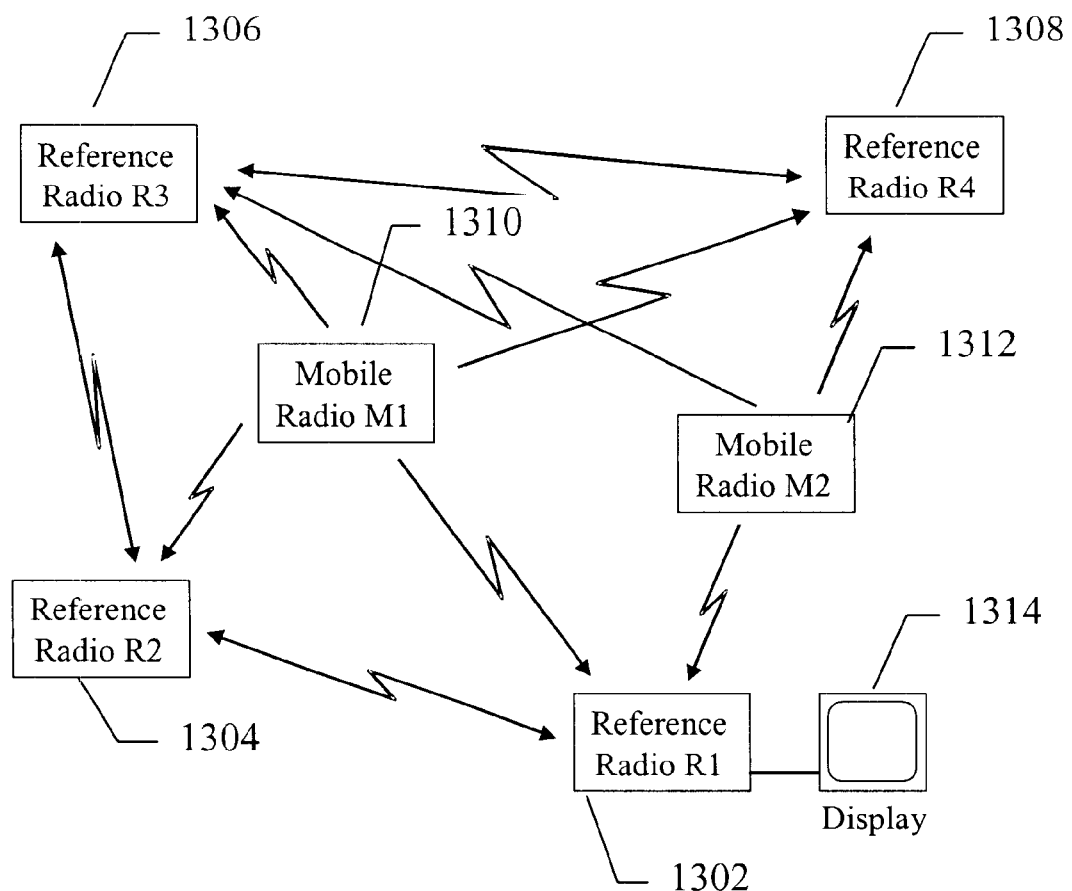
FIG. 13 is an example of a transmitter positioning architecture with unsynchronized transmitter tracking.

FIG. 13 is a block diagram showing a simple implementation of this architecture. This particular embodiment shows a system of four reference radios (R1, 1302 through R4, 1308) and two mobile radios (M1, 1310 and M2, 1312). The arrows between the radios represent two-way and one-way data and/or voice links. Notice that the mobile radios only transmit, thus they do not receive the transmissions from the other mobile radios. Unlike the Synchronous Transmitter Tracking architecture, the reference radios in this architecture are free-running (unsynchronized). There are several ways to implement this design, the most common involves relaying the time-of-arrival (TOA) pulses from the mobile and reference radios, as received at the reference radios, back to the reference master radio.

Each reference radio in this architecture is a two-way impulse radio transceiver; thus each link between reference radios can be either two-way (duplex) or one-way (simplex). TOA information will typically be transmitted from the reference radios back to the reference master radio where the TOAs will be converted to ranges and then XYZ position, which can then be displayed, 1314.

The reference radios used in this architecture are impulse radio two-way transceivers, the mobile radios are one-way impulse radio transmitters. The firmware in the radios varies slightly based on the functions each radio must perform. For example, R1, 1302 is designated as the reference master radio. It collects the TOA information, and typically will be responsible for forwarding tracking data for external graphical display, 1314. The remaining reference relay radios contain a separate version of the firmware, the primary difference being the different parameters or information that each reference relay radio must provide the network. Finally, the mobile radios have their own firmware version that transmits pulses in predetermined sequences.

Each reference radio link is a two-way link that allows for the passing of information, data and/or voice. The data-rates between each radio link is a function of several variables including the number of pulses integrated to get a single bit, the number of bits per data parameter, the length of any headers required in the messages, the range bin size, and the number of radios in the network.

Since the reference radios and mobile radios are free-running, synchronization is actually done by the reference master impulse radio 1302 alone. The oscillators used in the impulse radios will drift slowly in time, thus likely requiring continual monitoring and adjustment of synchronization at the reference master radio. The accuracy of this synchronization (timing) is dependent upon several factors. These factors include how often and how long each radio transmits along with other factors.

The purpose of the impulse radio geo-positioning network is to be able to track mobile radios. Tracking is accomplished by stepping through several steps. The most likely method is to have each reference radio periodically (randomly) transmit a pulse sequence. Then, when a mobile radio enters the network area and begins to transmit pulses, the reference radios pick up these pulses as time-of-arrivals (TOAs) as well as the pulses (TOAs) transmitted by the other reference radios. TOAs can then either be relayed back to the reference master radio or just collected directly (assuming it can pick up all the transmissions). The reference master radios then converts these TOAs to ranges, which are then used to calculate mobile radio XYZ position in local coordinates. If the situation warrants and the conversion possible, the local coordinates can be converted to any one of the worldwide coordinates such as Earth Centered Inertial (ECI), Earth Centered Earth Fixed (ECEF), or J2000 (inertial coordinates fixed to year 2000).

Synchronized Receiver Tracking

In Synchronized Receiver Tracking, a network of fixed-location reference impulse radio transceivers allow the position of multiple impulse radio mobile receivers to be determined. This architecture is different from the Synchronized Transmitter Tracking architecture in that in this design the mobile receivers will determine their positions but will not be broadcasting it to anyone (since they are receive-only radios). The network is designed to be scalable, allowing from very few reference and mobile radios to a very large number of both.

Figure 14:
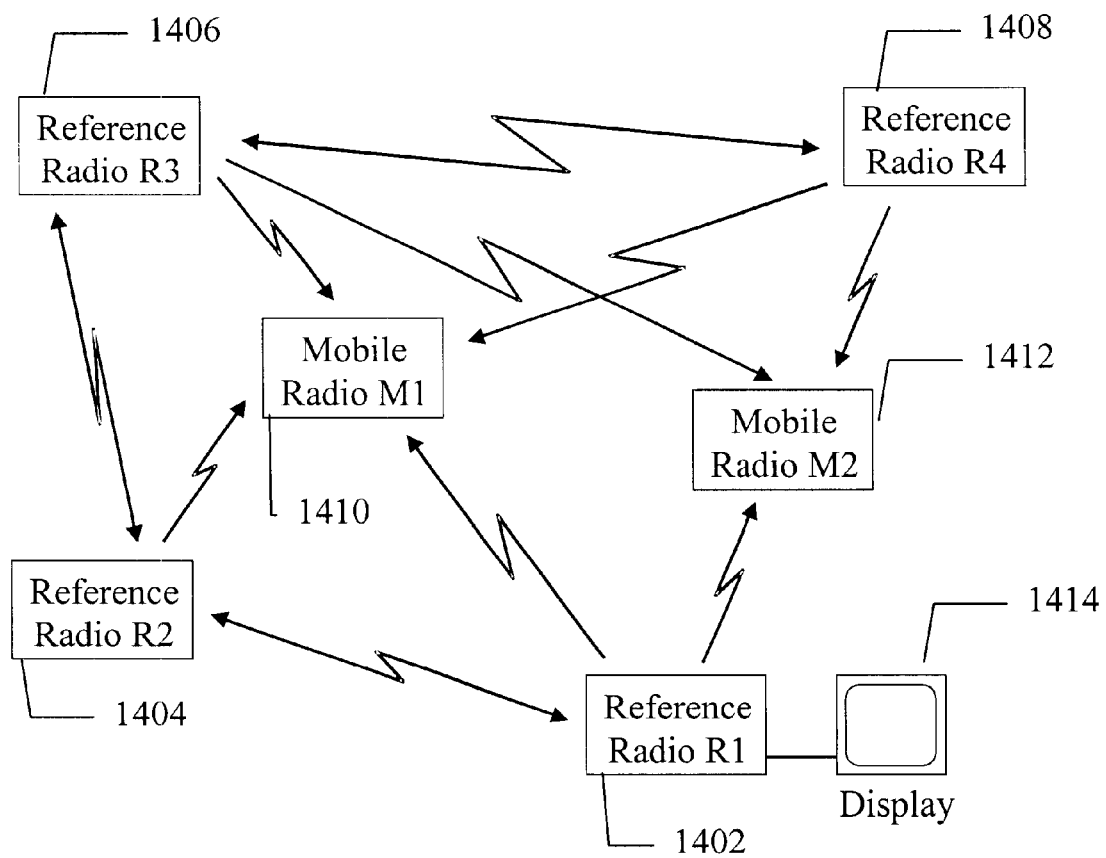
FIG. 14 is an example of a receiver positioning architecture with synchronized receiver tracking.

FIG. 14 is a block diagram showing a simple implementation of this architecture. This particular example shows a system of four reference radios (R1, 1402 through R4, 1408) and two mobile radios (M1, 1410 and M2, 1412). The arrows between the radios represent two-way and one-way data andlor voice links. Notice that the mobile radios only receive transmissions from other radios, and do not transmit.

Each reference radio is a two-way transceiver, each mobile radio is a receive-only radio. Precise, synchronized pulses are transmitted by the reference network and received by the other reference radios and the mobile radios. The mobile radios takes these times-of-arrival (TOA) pulses, converts them to ranges, then determines its XYZ position. Since the mobile radios do not transmit, only they themselves will know their XYZ position.

The reference radios used in this architecture are impulse radio two-way transceivers, the mobile radios are receive-only radios. The firmware for the radios varies slightly based on the functions each radio must perform. For example, R1, 1402 is designated as the reference master radio. It directs the synchronization of the reference radio network. The remaining reference relay radios contain a separate version of the firmware, the primary difference being the different parameters or information that each reference relay radio must provide the network. Finally, the mobile radios have their own firmware version that calculates their position and displays it locally if desired.

Each reference radio link is a two-way link that allows for the passing of information, data and/or voice. The mobile radios are receive-only. The data-rates between each radio link is a function of several variables including the number of pulses integrated to get a single bit, the number of bits per data parameter, the length of any headers required in the messages, the range bin size, and the number of radios in the network.

By transmitting in assigned time slots and by carefully listening to the other reference radios transmit in their assigned transmit time slots, the entire group of reference radios within the network will be able to synchronize themselves. The oscillators used on the impulse radio boards will drift slowly in time, thus requiring continual monitoring and adjustment of synchronization. The accuracy of this synchronization (timing) is dependent upon several factors. These factors include how often and how long each radio transmits along with other factors.

The purpose of the impulse radio geo-positioning network is to be able to track mobile radios. Tracking is accomplished by stepping through several well-defined steps. The first step is for the reference radios to synchronize together and begin passing information. Then, when a mobile radio enters the network area, it begins receiving the time-of-arrival (TOA) pulses from the reference radio network. These TOA pulses are converted to ranges, then the ranges are used to determine mobile radio XYZ position in local coordinates using a least squares-based estimator. If the situation warrants and the conversion possible, the local coordinates can be converted to any one of the worldwide coordinates such as Earth Centered Inertial (ECI), Earth Centered Earth Fixed (ECEF), or J2000 (inertial coordinates fixed to year 2000). Finally, the mobile radio forwards its position solution to the reference master radio for storage and real-time display.

Unsynchronized Receiver Tracking

In Unsynchronized Receiver Tracking, a network of fixed-location reference impulse radio transceivers allow the position of multiple impulse radio mobile receivers to be determined. This architecture is different from the Synchronized Receiver Tracking architecture in that in this design the reference radios are not time-synchronized. Similar to the Synchronized Receiver Tracking architecture, mobile receive-only radios will determine their positions but will not be broadcasting it to anyone (since they are receive-only radios). The network is designed to be scalable, allowing from very few reference and mobile radios to a very large number of both.

Figure 15:
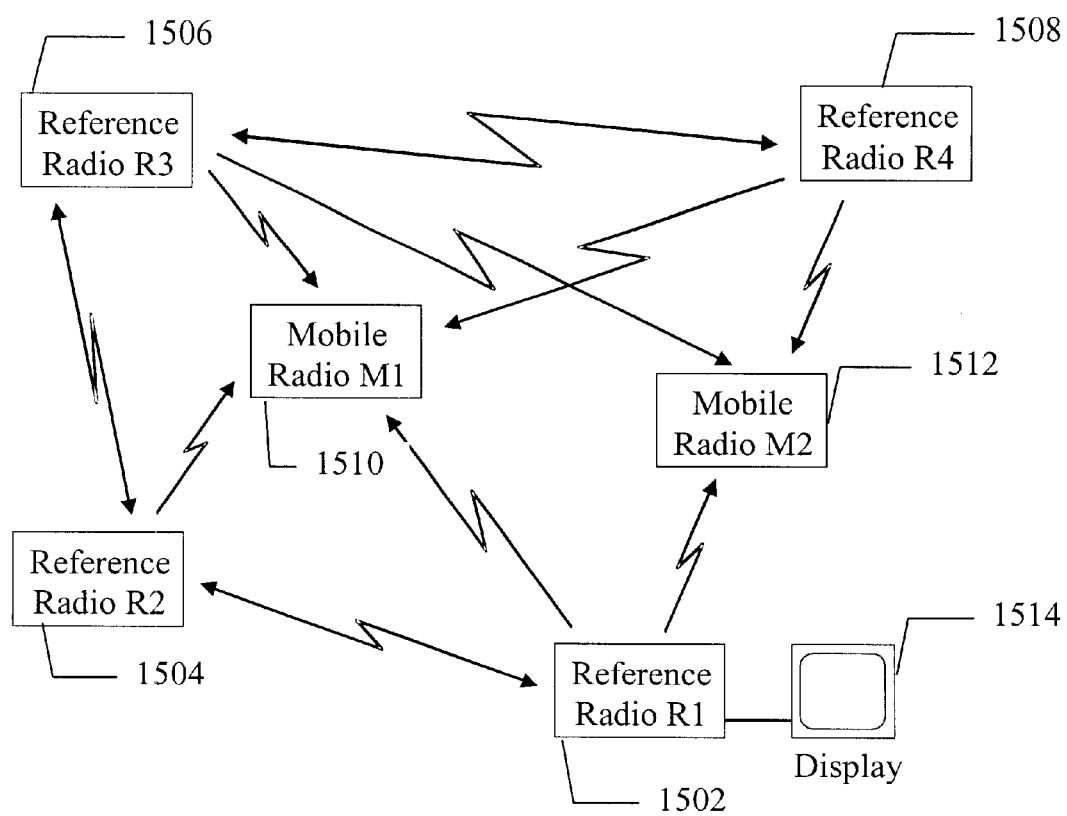
FIG. 15 is an example of a receiver positioning architecture with unsynchronized receiver tracking.

FIG. 15 is a block diagram showing a simple implementation of this architecture. This particular example shows a system of four reference radios (R1, 1502 through R4, 1508) and two mobile radios (M1, 1510 and M2, 1512). The arrows between the radios represent two-way and one-way data and/or voice links. Notice that the mobile radios only receive transmissions from other radios, and do not transmit.

Each reference radio is an impulse radio two-way transceiver, each mobile radio is a receive-only impulse radio. Precise, unsynchronized pulses are transmitted by the reference network and received by the other reference impulse radios and the mobile impulse radios. The mobile radios takes these times-of-arrival (TOA) pulses, converts them to ranges, then determines its XYZ position. Since the mobile impulse radios do not transmit, only they themselves will know their XYZ position.

The impulse radio reference radios used in this architecture are impulse radio two-way transceivers, the mobile radios are receive-only radios. The firmware for the radios varies slightly based on the functions each radio must perform. For this design, the reference master radio may be used to provide some synchronization information to the mobile radios or the mobile radio itself (knowing the XYZ for each reference radio) may do all of the synchronization internally.

The data-rates between each radio link is a function of several variables including the number of pulses integrated to get a single bit, the number of bits per data parameter, the length of any headers required in the messages, the range bin size, and the number of impulse radios in the network.

For this architecture, the reference radios transmit in a free-running (unsynchronized) manner. The oscillators used on the impulse radio boards will drift slowly in time, thus requiring continual monitoring and adjustment of synchronization by the reference master radios or the mobile radio (whomever is doing the synchronization). The accuracy of this synchronization (timing) is dependent upon several factors. These factors include how often and how long each radio transmits along with other factors.

The purpose of the impulse radio geo-positioning network is to be able to track mobile radios. Tracking is accomplished by stepping through several steps. The first step is for the reference radios to begin transmitting pulses in a free-running (random) manner. Then, when a mobile radio enters the network area, it begins receiving the time-of-arrival (TOA) pulses from the reference radio network. These TOA pulses are converted to ranges, then the ranges are used to determine mobile radio XYZ position in local coordinates using a least squares-based estimator. If the situation warrants and the conversion possible, the local coordinates can be converted to any one of the worldwide coordinates such as Earth Centered Inertial (ECI), Earth Centered Earth Fixed (ECEF), or J2000 (inertial coordinates fixed to year 2000). Finally, the mobile radio forwards its position solution to the reference master radio for storage and real-time display 1514.

For ease of reference, in the following diagrams the below legend applies.

Symbols and Definitions

● Receiver Radio (receive only)

x Transmitter Radio (transmit only)

⊗ Transceiver Radio (receive and transmit)

$R_i$ Reference Radio (fixed location)

$M_i$ Mobile Radio (radio being tracked)

↭ Duplex Radio Link

↝ Simplex Radio Link

TOA, DTOA Time of Arrival, Differenced TOA

Figure 16:
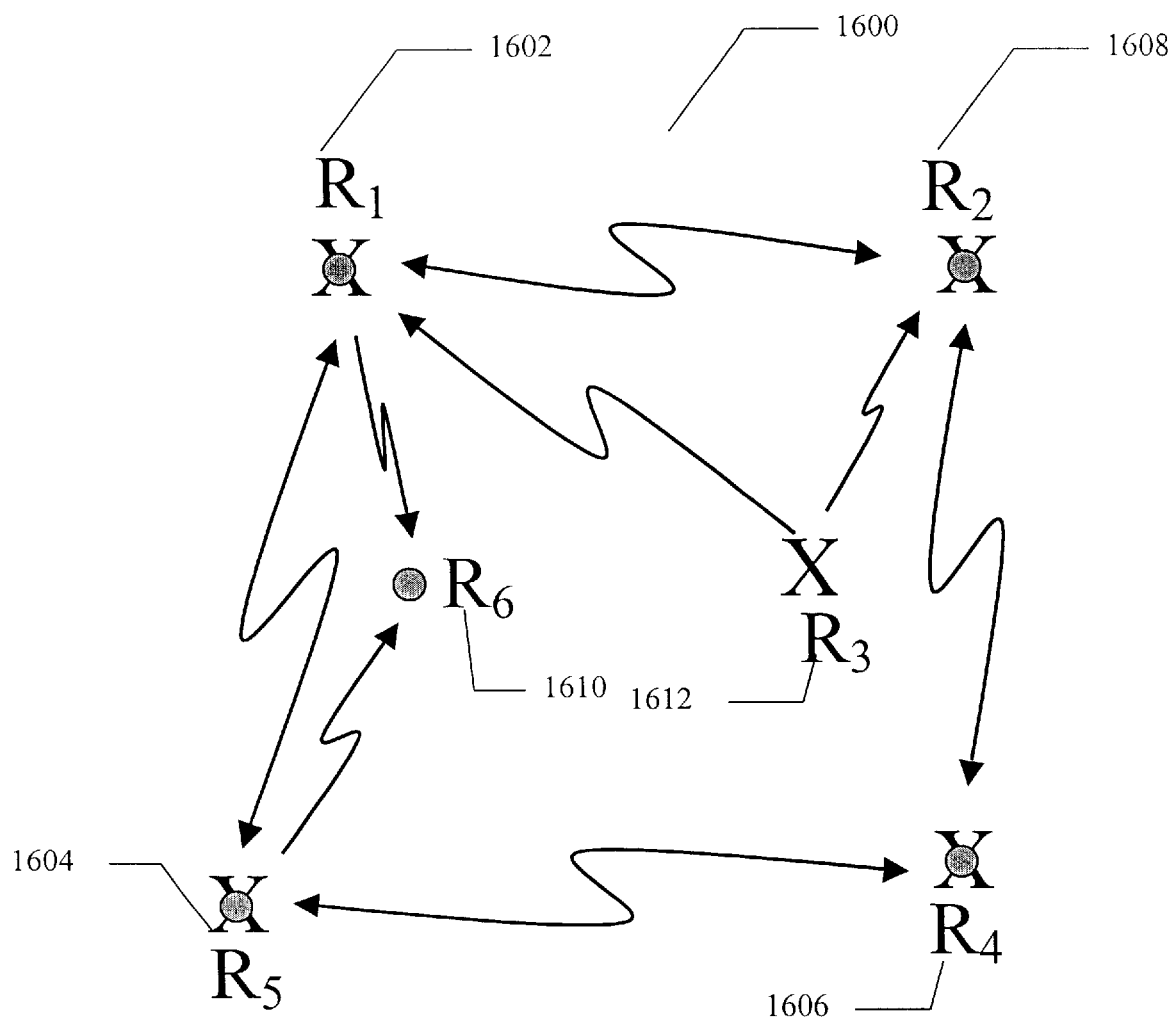
FIG. 16 is an example of a mixed mode positioning architecture with mixed mode referenced radios.

FIG. 16 shows a Mixed Mode Reference Radio architecture. This architecture defines a reference network comprised of any combination of transceivers ($R_1$, $R_2$, $R_4$, $R_5$), transmitters ($R_3$), and receivers ($R_6$). Mobile radios entering this mixed-mode reference network will then use whatever reference radios are appropriate.

Figure 17:
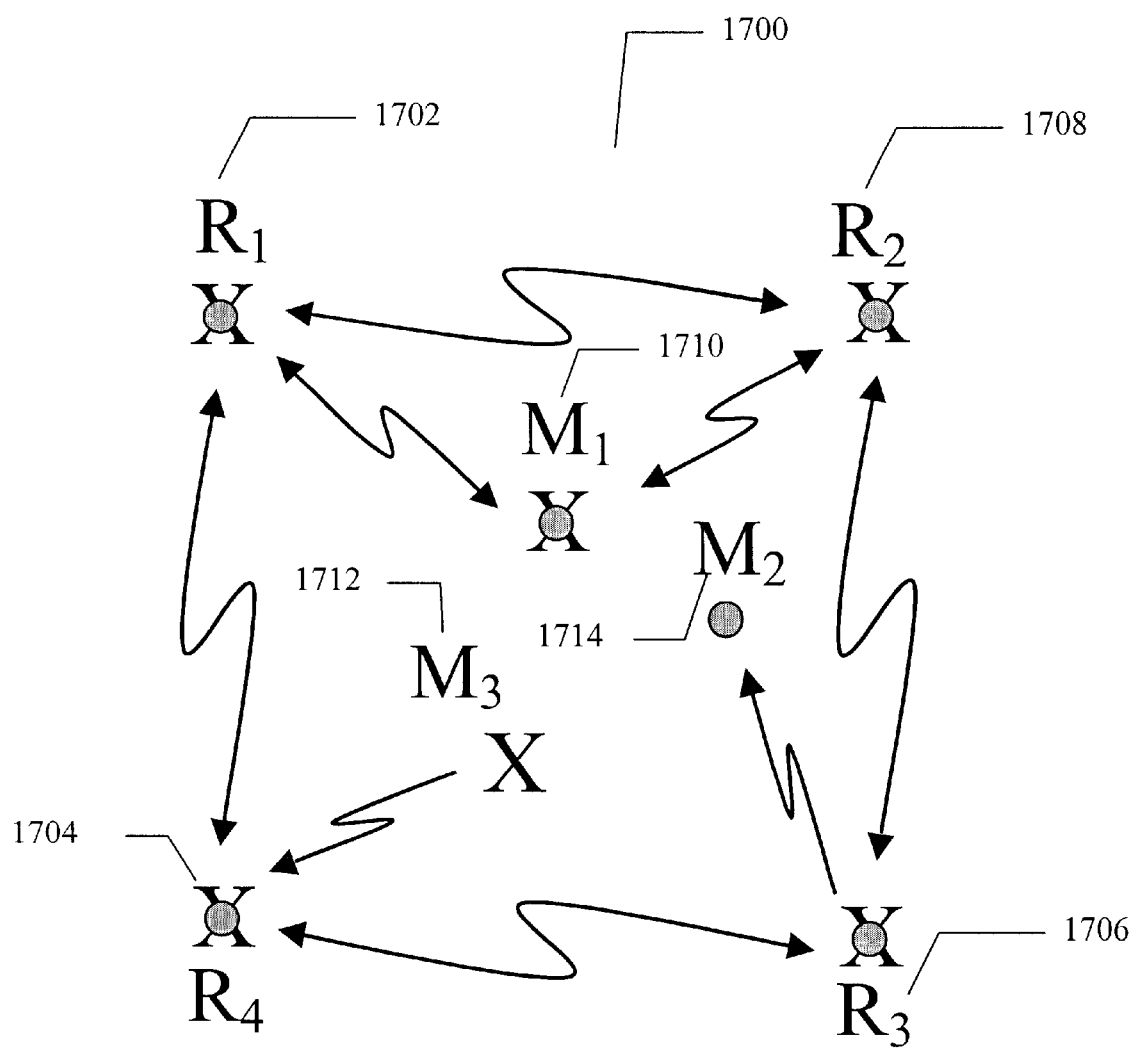
FIG. 17 is an example of a mixed mode positioning architecture with mixed mode mobile radios.

FIG. 17 describes a mixed mode architecture with a combination of transceivers, transmitters and receivers. Herein, the mobile impulse radios 1712, 1710, 1714 are the mixed mode and the reference impulse radios 1702, 1704, 1706 and 1708 are likely time-synched. In this illustrative example, the mobile radio 1712 is a transmitter only, 1714 is a receiver only and 1710 is a transceiver. The determination of the mix of mobile impulse radios and reference radios will be determined by system requirements. For example, in the Disney World example the Park may want to rent out one device to customers that can locate a child if lost, another to help the customer find bathrooms and roller coasters or both; and the reference radios must work with both types of mobile impulse radio systems.

Figure 18:
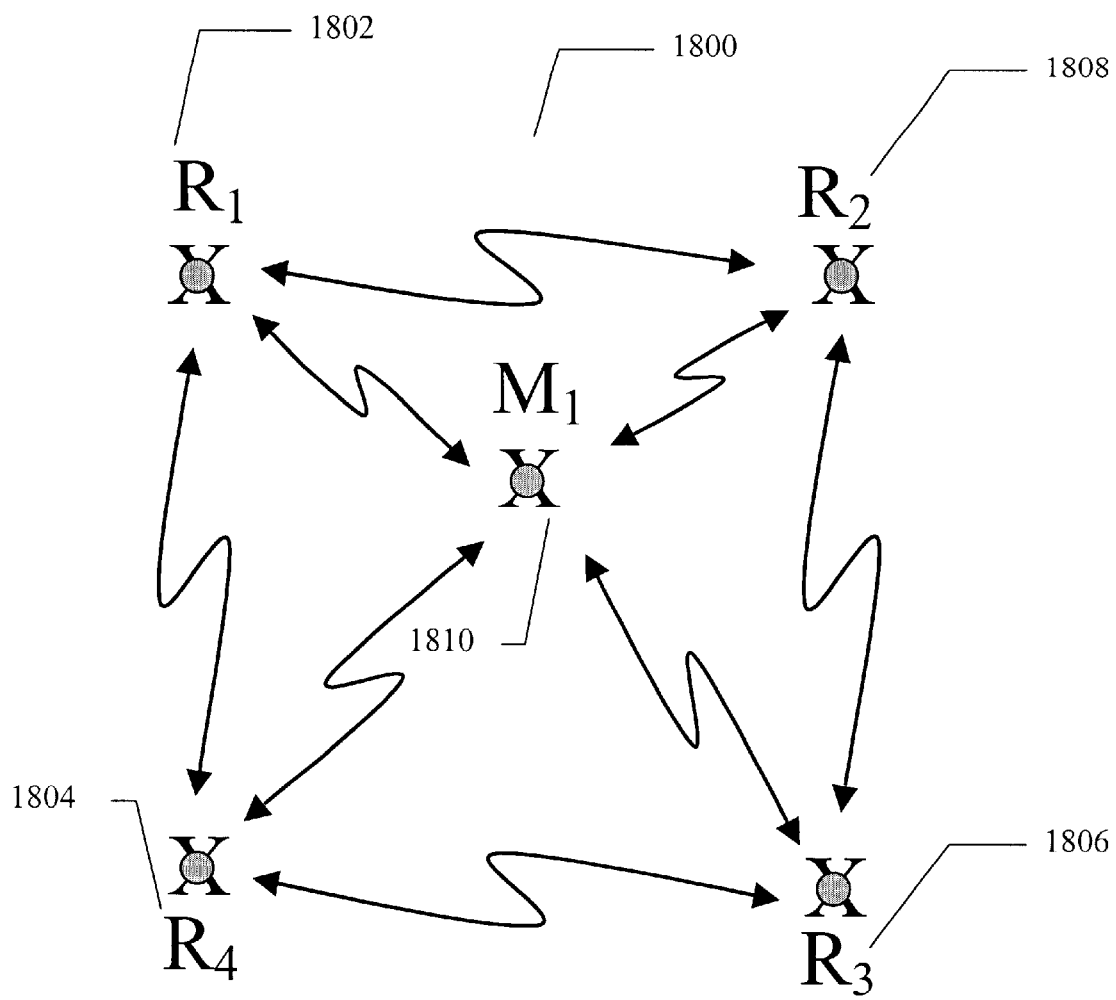
FIG. 18 is an example of a specialized antenna architecture with steerable null antennae designs.

As detailed above and in the referenced patent applications, a steerable null antennae can be used with impulse radio distance calculations. By using the example architecture of FIG. 18, a system can be implemented to take advantage of this distance measuring using steerable null antennae. Herein, all of the reference radios 1802, 1804, 1806 and 1808 or some of them can utilize steerable null antenna designs to direct the impulse propagation; with one important advantage being the possibility of using fewer impulse radios or improving range and power requirements. The mobile impulse radio transceiver 1810 can also use a steerable null antenna for most architectures.

Figure 19:
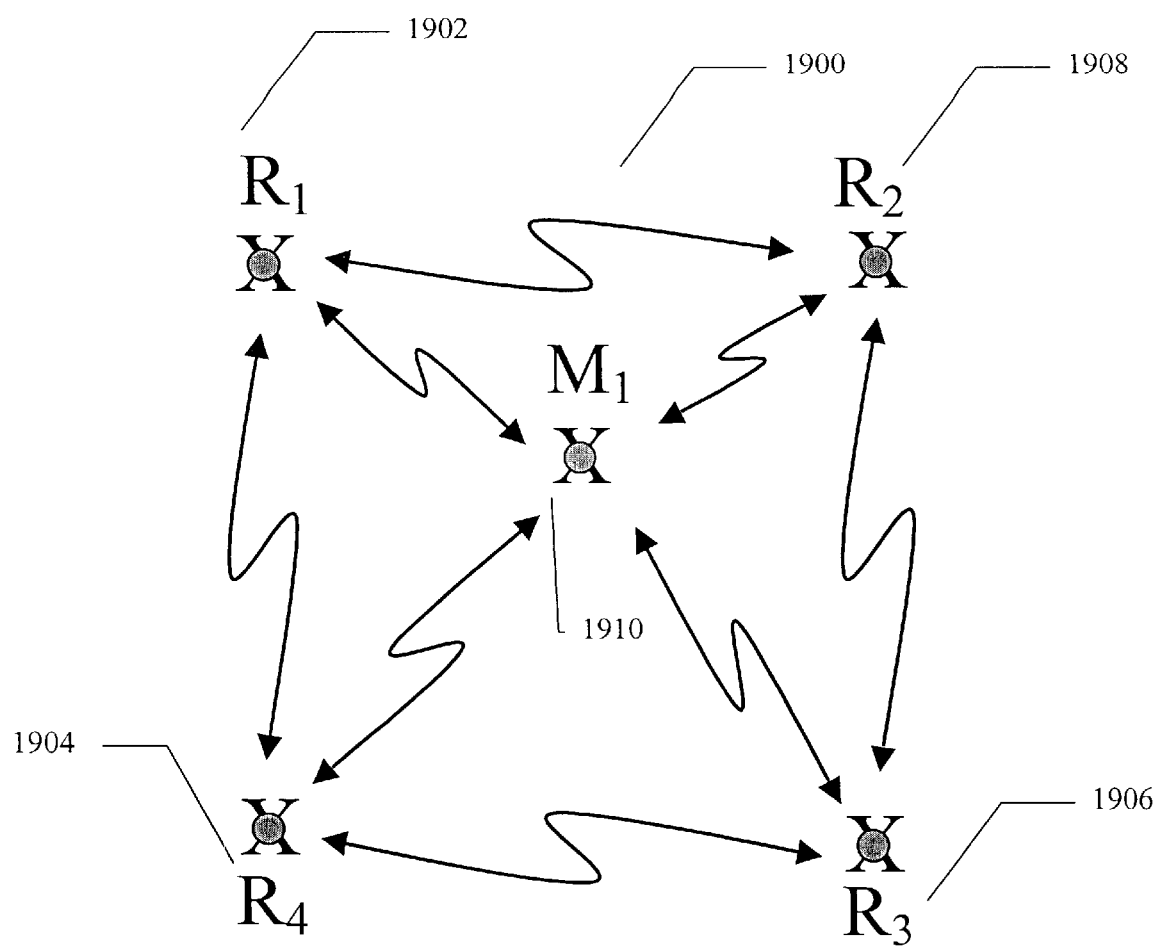
FIG. 19 is an example of a specialized antenna architecture with different antennae designs.

FIG. 19 illustrates the possibility of using specialized antennae architectures. Impulse radios 1902, 1904, 1906 and 1908 of this architecture may use a difference antenna analogous to the phase difference antenna used in GPS carrier phase surveying. The reference radios should be time synched and the mobile radio 1910 herein can transmit and receive. Again, it should be noted that in this, as all architectures, the number of radios is for illustrative purposes only and more than one mobile impulse radio can be implemented in the present architecture.

Figure 20:
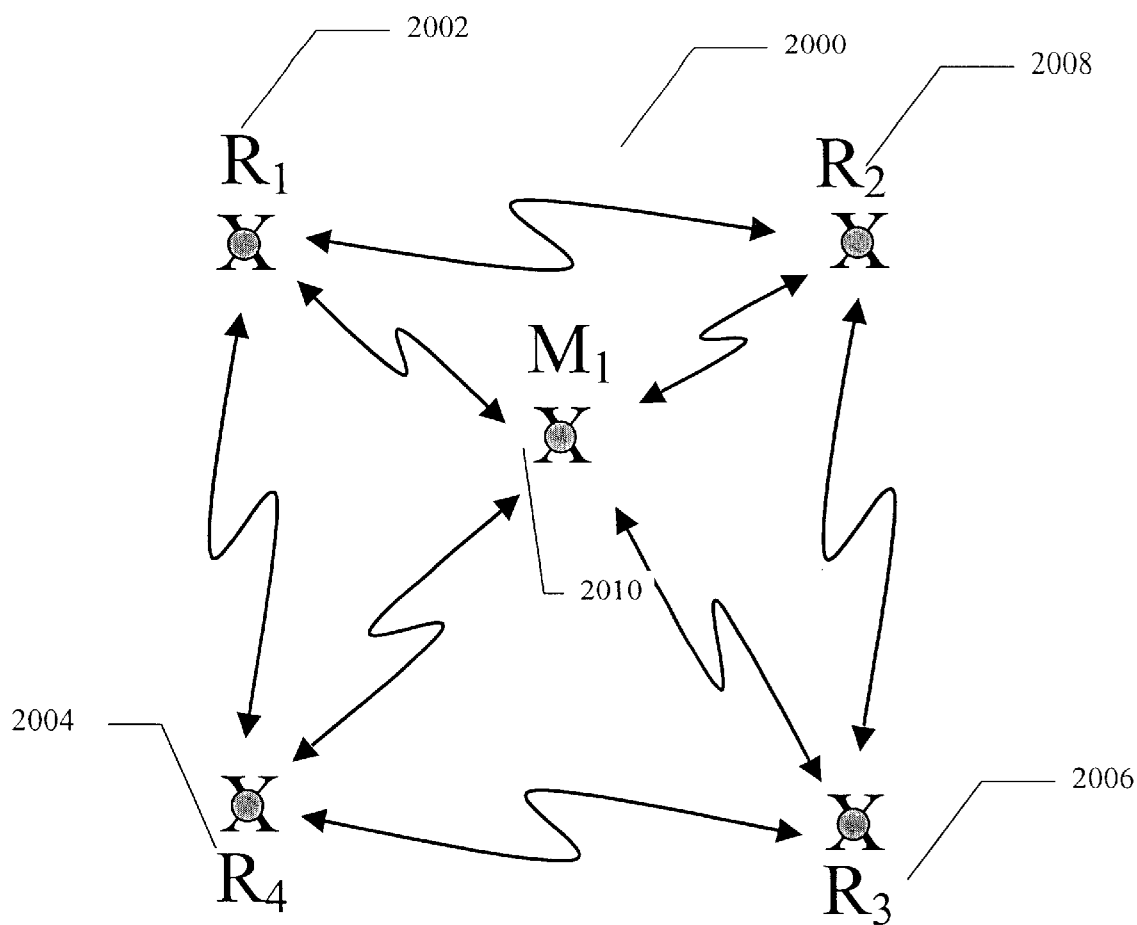
FIG. 20 is an example of a specialized antenna architecture with directional antennae designs.

FIG. 20 illustrates a specialized antennae architecture wherein directional antennae are used and wherein the reference impulse radios 1902, 1904, 1906 and 1908 are time synched. As with the steerable null antennae design, the implementation of this architecture will be driven by design requirements. Also, herein the mobile impulse radio transceiver 1910 can be use a directional antennae.

Figure 21:
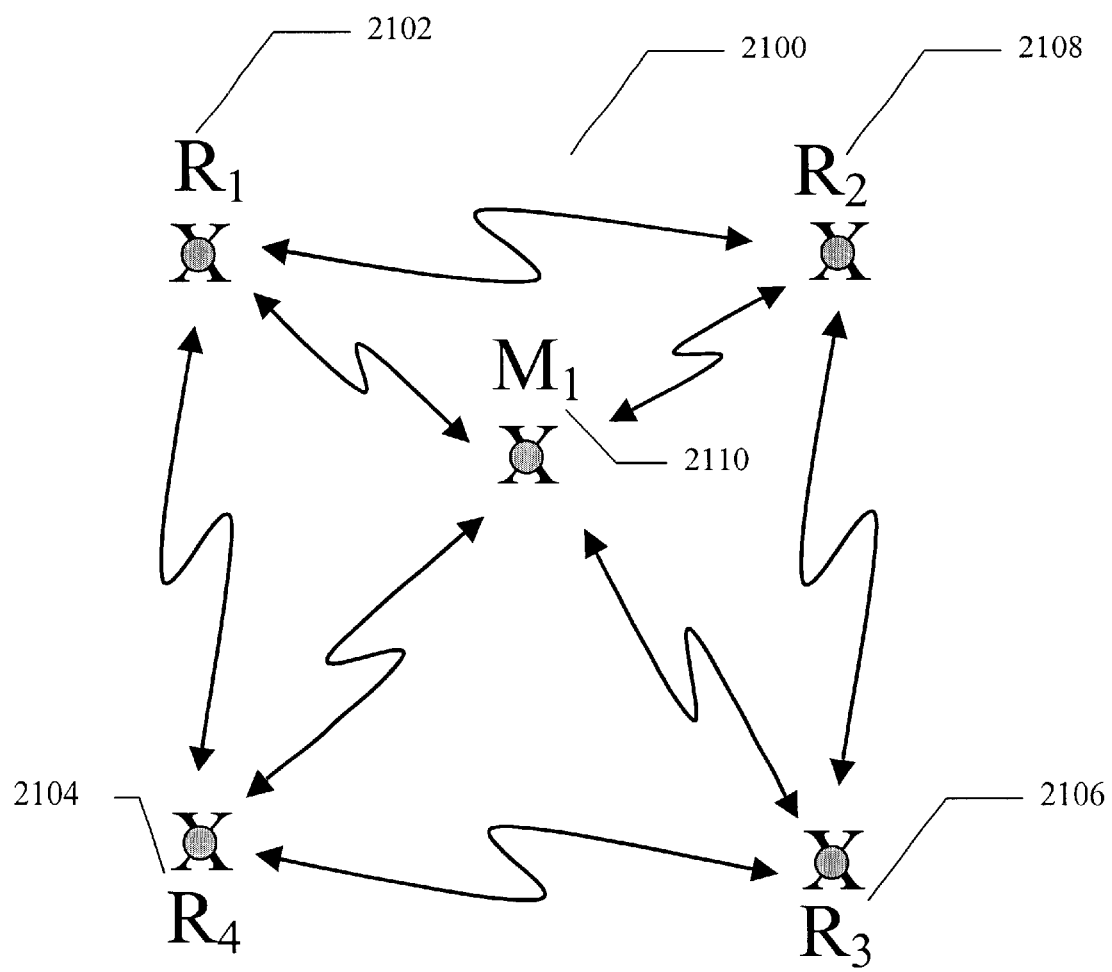
FIG. 21 is an example of amplitude tracking architectures with amplitude sensing tracking.

FIG. 21 illustrates amplitude sensing architectures wherein amplitude sensing is used for tracking and positioning. Herein, reference radios 2002, 2004, 2006 and 2008 are likely time-synched. Instead of measuring range using TOA methods (round-trip pulse intervals), signal amplitude is used to determine range. Several implementations can be used such as measuring the "absolute" amplitude and comparing to pre-defined look up table that relates range to amplitude, or "relative" amplitude where pulse amplitudes from separate radios are differenced.

Figure 22:
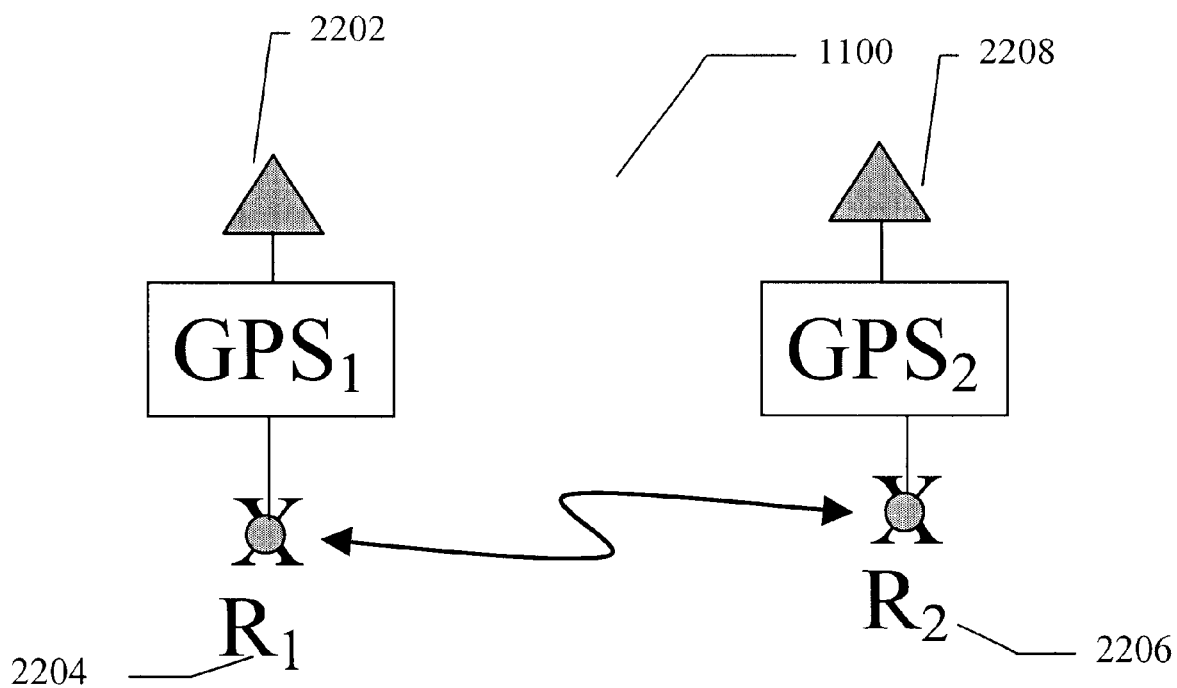
FIG. 22 is an example of navigation augmentation architectures with GPS augmentation.

In addition to position locating within an impulse radio network, impulse radios can be used to augment existing positioning systems to improve on these systems or to broaden potential coverage areas for impulse radio systems. FIG. 22 illustrates an impulse radio navigation augmentation architecture for augmentation of Global Positioning Systems (GPS). Impulse radios 2204 and 2206 would be used to augment stand-alone GPS receivers. Impulse radio measurements (range, doppler, TOA, etc.) can be used to provide both additional accuracy and better geometry in particular cases. For example, $GPS_1$, 2202 might be in the clear while $GPS_2$, 2208, would be in foliage. $GPS_1$, 2202 could provide both differential GPS (DGPS) corrections and impulse measurements to $GPS_2$, 2208 to improve $GPS_2$, accuracy.

Figure 23:
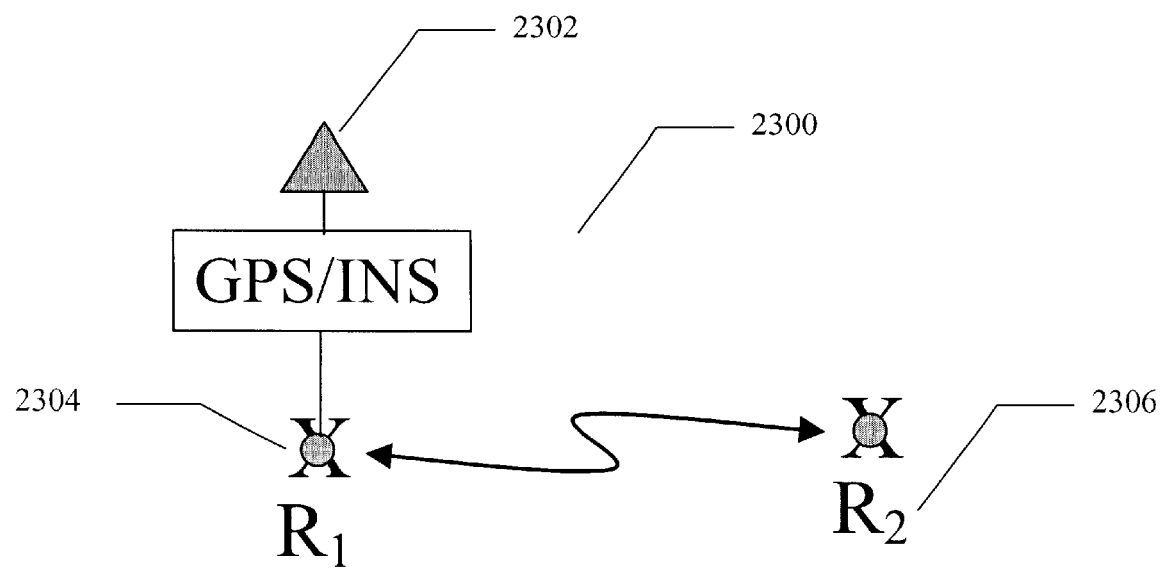
FIG. 23 is an example of navigation augmentation architectures with GPS/INS augmentation.
Figure 24:
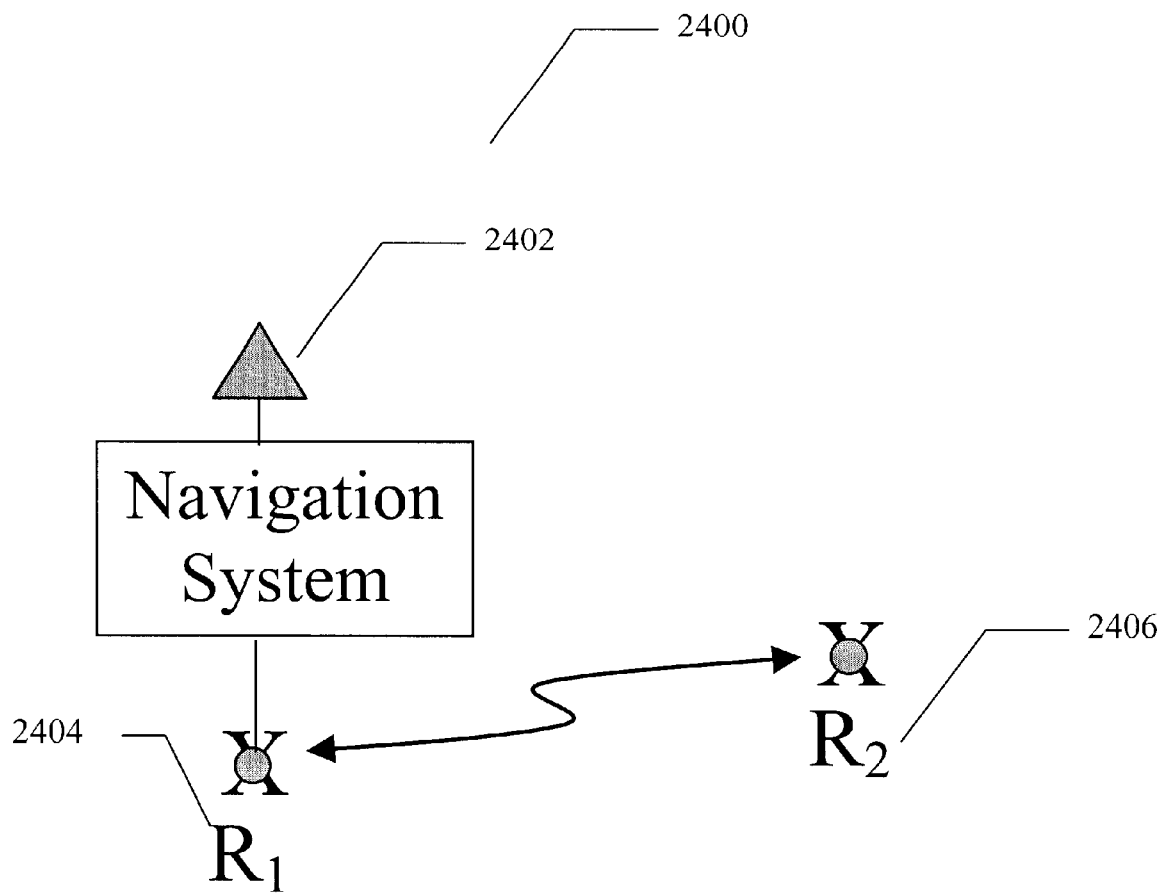
FIG. 24 is an example of navigation augmentation architectures with generic navigation sensor augmentation.

FIG. 23 illustrates GPS/INS augmentation in navigation augmentation architectures 2300. Herein impulse radios 2304 and 2306 would be used to augment GPS/INS (inertial navigation system) units. Impulse radio measurements (range, doppler, TOA, etc.) can be used to provide both additional accuracy and better geometry in particular cases. Herein impulse radio 2304 could provide impulse radio measurements to the GPS/INS 2302 to improve accuracy.

Not only GPS and GPS/INS derive benefits from integrating with impulse radios, generic navigation sensors can be augmented 2400 as well. Impulse radios 2404 can be interfaced with various navigation systems such as electro-optical, LORAN, LASER, LIDAR, radar, SAR, VOR, DME, magnetic compasses etc. Impulse radio measurements (range, doppler, TOA, etc.) can be used to provide additional accuracy and better geometry in particular cases. Herein, impulse radio 2206 would communicate with impulse radio 2404 which as mentioned is interfaced with the navigation system.

Figure 25:
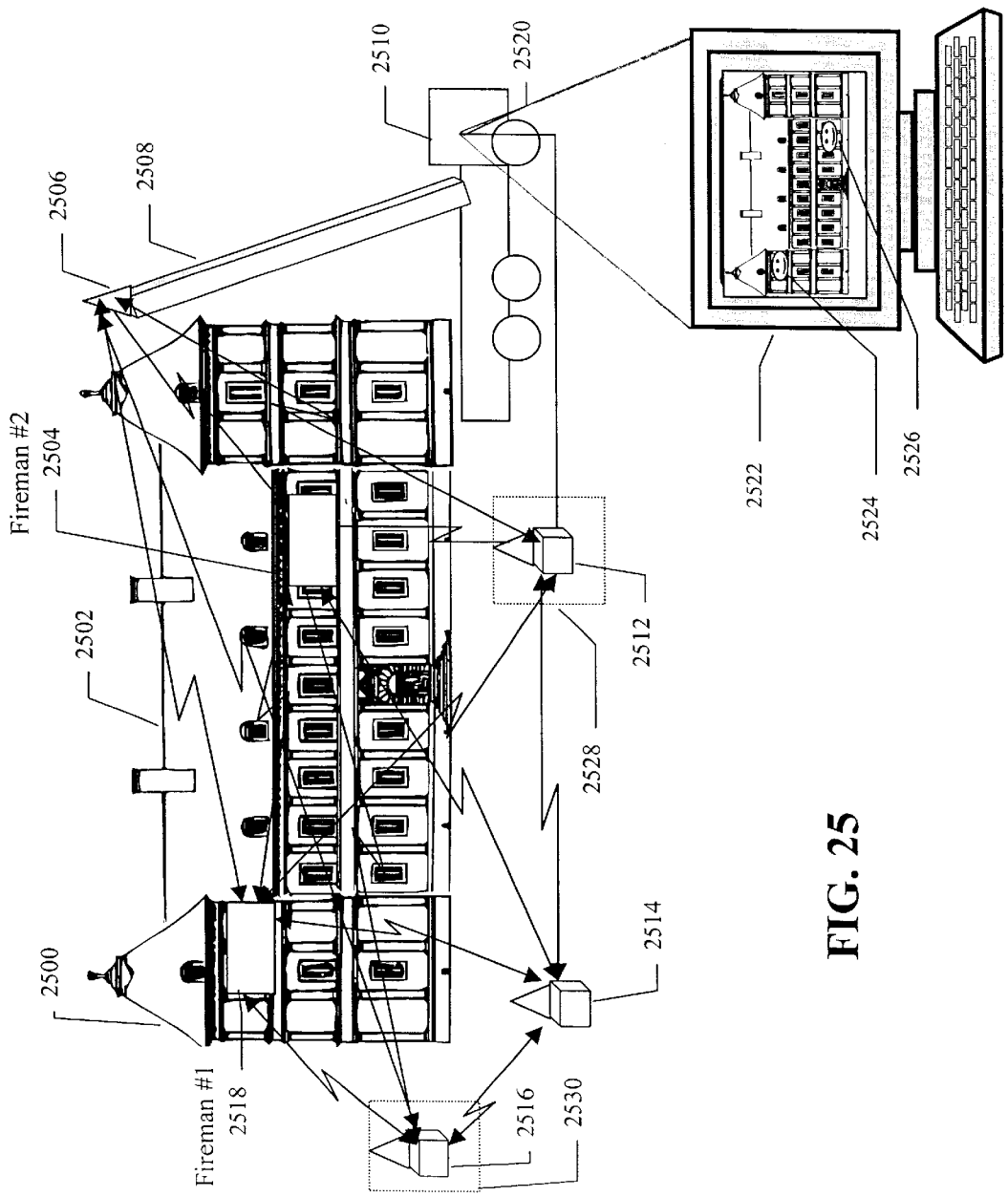
FIG. 25 illustrates impulse radio mobile positioning wherein the position of firefighters within a building are determined.

Using the properties associated with impulse radio technology in one of the aforementioned architectures and with the distance and positioning techniques herein articulated and in the patents incorporated herein by reference, the following impulse radio mobile position locating system and method is used in building environment 2500. Further, the system and method herein provides for the position locating to be mobile and capable of locating persons in an environment such as firefighters in a burning building. Because fire departments don't know in which buildings fires are going to occur, they must be able to implement the system on the fly. FIG. 25 shows building 2502 where a fire or other emergency may be taking place (an example of another emergency may be policeman knowing the locating of officers in a building with hostages). Firemen #1,2518, in this embodiment is positioned in the upper left portion of building 2502. Fireman #2,2504, is located on the second floor towards the right portion of the building 2502.

Upon arrival at the building, mobile impulse radios 2516, 2514 and 2512 are positioned around the building 2502. Two of the reference radios are positioned in pre-designated areas 2528 and 2530 that were ascertained during the initial setup. This enables positioning relative to the building schematic and overlay In order to get three dimensional locating, a fourth impulse radio receiver 2506 is located non-coplaner to the rest of the impulse radios location such as on top of the fire truck ladder 2508 connected to fire truck 2510. Located inside of fire truck 2510 is a computer with monitor 2520 (shown blown up as 2522). The computer with monitor has preprogrammed into it an overlay of a schematic or blue print of the building for which the fire is located. A given fire department is typically responsible for a given area and will have already programmed the information in to the computer and when a fire is determined to be present the address is typed in and an overlay of the building is displayed.

By using one of the of architectures illustrated above, the position of firefighter #1,2518, and firefighter #2,2504 can be determined. Since buildings and scenarios vary widely from fire department to fire department, the best suited architecture will be on a case by case basis. In the current illustration, the architecture of FIG. 10 is used. Once the reference radios are set up, reference radio 2514 talks to reference radios 2516, 2512, 2506 and fireman #1,2518 mobile impulse radio and fireman #2,2514 impulse radio. Similarly the rest of the impulse radios synch to each other and the fireman radios. In this case, since the fireman's 2518 and 2504 mobile impulse radios are impulse radio transceivers, they can have two way communications and can also be interfaced with a sensor to relate information to the monitor outside such as temperature or the fireman's heart rate. This is one of the truly unique characteristics of impulse radio: the dual functionality relating to positioning and communications in one impulse radio.

The information can be processed in impulse radio 2512 or it can be done in computer 2522. The computer 2522 processes the information and puts the information into displayable form by taking the blue print or schematic and positioning information and displaying the position of fireman #1,2518 as shown at 2524 and fireman #2,2504, as shown in 2526.

Figure 26:
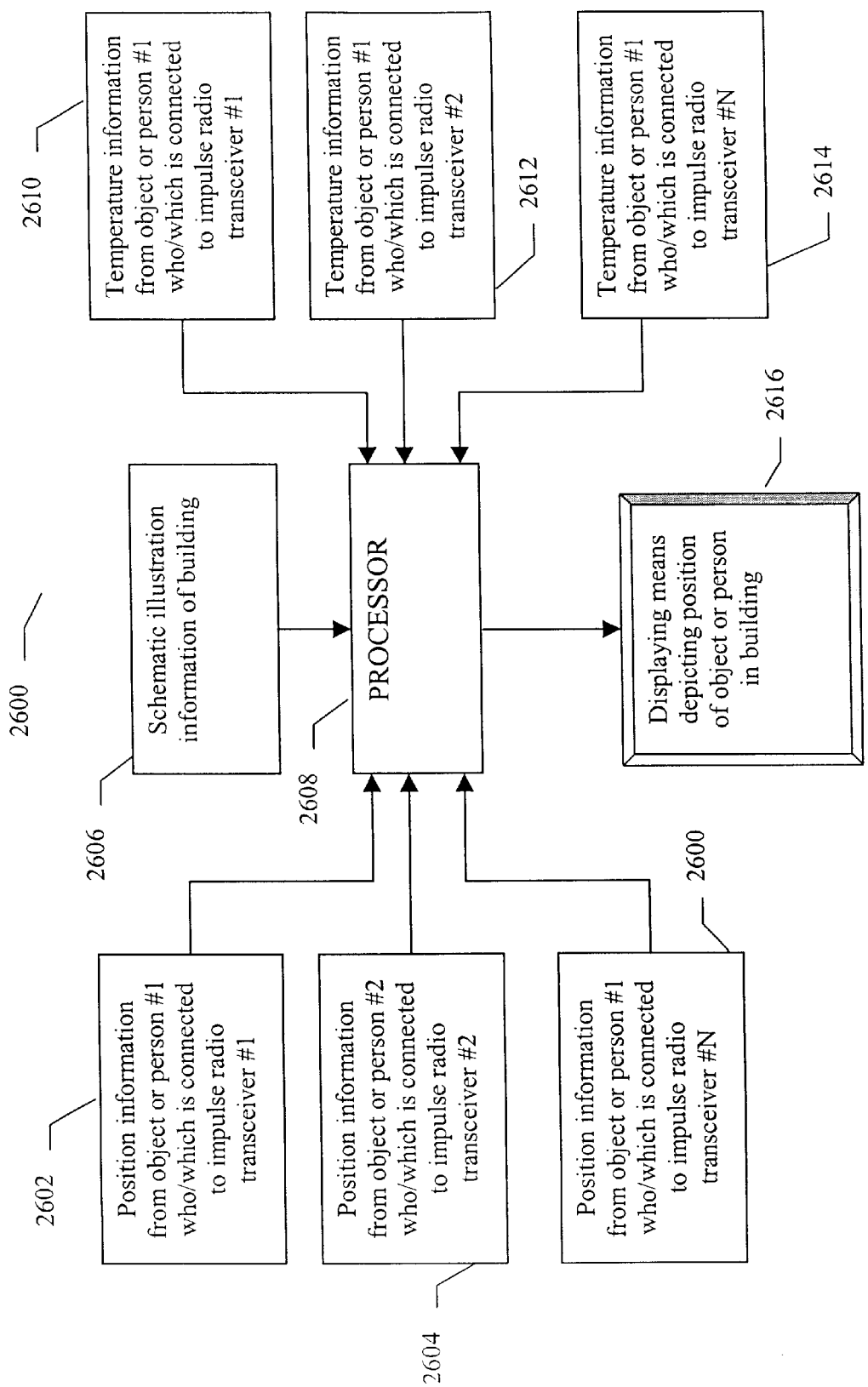
FIG. 26 is a block diagram illustrating the components in the impulse radio mobile positioning system and method of FIG. 25.

FIG. 26 at 2600 illustrates in a block diagram the information received by processor 2608 located in computer 2520. The processor 2608 receives position information 2602 from fireman #1,2518, who is connected to impulse radio #1. Processor 2608 also receives information from fireman #2,2504, connected to impulse radio #2, wherein both impulse radios attached to the fireman are in communication with all reference impulse radios wherein the positioning is determined. At 2600 it is illustrated that N possible fireman can be located within the building 2502 and there positions can also be determined. As mentioned, the processor 2608 can receive information 2610 and 2614 from both fireman's impulse radio transceivers concerning temperature where the fireman are at. Again, N different parameters can be sensed and passed to be displayed as shown at 2614.

The processor takes the above positioning and sensed information and the information concerning the layout of the building 2606 and displays the information on display 2616. Although a display is illustrated, it is understood that the information could be interfaced with a variety of monitoring devices. For example, the fireman's heart rate can be displayed on heart rate monitor thus determining in very severe cases whether or not the fireman is under sever stress or even alive.

Only slight modifications to this burning building example would be required to implement the above system in the aforementioned prison environment. As with the firefighters, the prison guards would carry the mobile radio with them and with the incorporation of one of the above architectures can use the mobile device to communicate with other monitoring prison guards. There would likely not be a requirement for the reference radios to be portable as they could be hard wired and local AC powered. Further, the same mobile impulse radio would be used within the defined reference radio area (i.e., the prison), and could thereby provide exact location information. Also, if the prison guard were in potential danger, an alerting means could be used and the dispatch of additional security personnel could be dispatched to the distressed guards location immediately.

Figure 27:
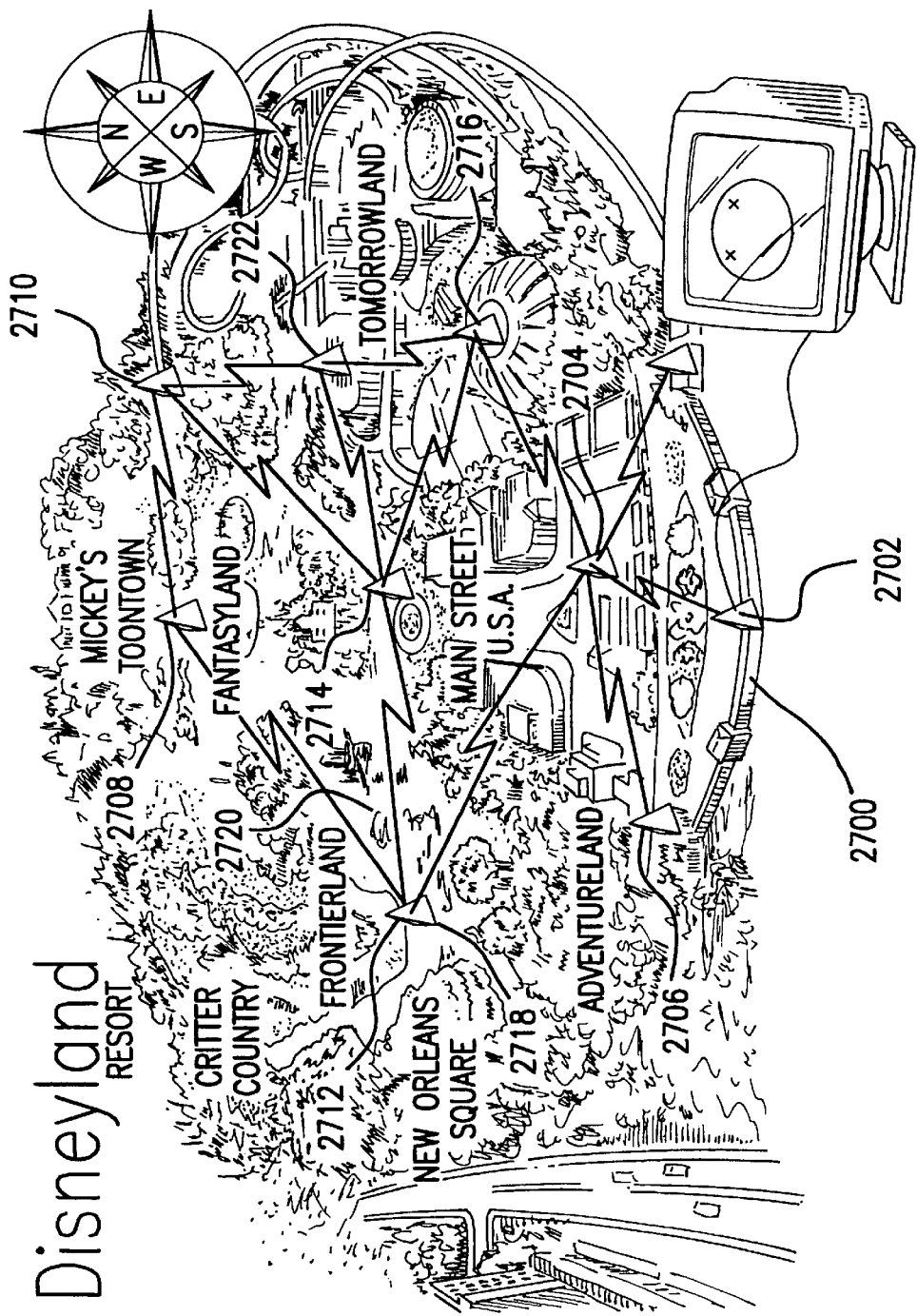
FIG. 27 illustrates the impulse radio fixed positioning system wherein the location of a child in a theme park is depicted.

FIG. 27 illustrates the impulse radio position system and method as used in an environment such as a DisneyLand resort. Reference impulse radio transceivers 2702, 2704, 2706, 2708, 2710, 2712, 2714, 2716 and 2718 are positioned for maximum coverage throughout the park and are in known reference positions. Note the severe multipath characteristics of a theme part such as this: trees, metal rides and metal buildings. Since the area to be covered is not variable as in the burning building scenario, the reference impulse radios can be either in communication with each other via wired or wireless means. Depending on the requirements of the park, many of the above architectures can be utilized. For example, if the theme park desires that every child be able to be located, the requirements for long battery life and inexpensive impulse radio are required. Thus an architecture like 14A would be a good match, where the mobile impulse radio receiver is just a transmitter (i.e., low cost and very inexpensive) and the reference radios are all in synch (easily done if all radios are hardwired or even if communicating via wireless impulse radio transmissions). If the theme park wanted to provide emergency personnel at the park a device that would show the where to go immediately and cost was less of a concern, then the architecture illustrated in FIG. 14B would be used. Herein, the mobile impulse radio could provide them with their location and show them how to get to the emergency. Also, again due to the unique properties of impulse radio, communications could be accomplished with the impulse mobile radio.

In the lost child example, stations 2720 and 2722 could be set up for locating the child when lost. The mobile impulse radio associated with the child and his parents is stored in the computer at the time of issue. When lost, the parents can go to station 2720 or 2722 and inform them of the child's name and request they activate the display for that child. As with the burning building example, an overlay of the park is in the computer memory and provides a visual display 2724 of the location of the child.

Figure 28:
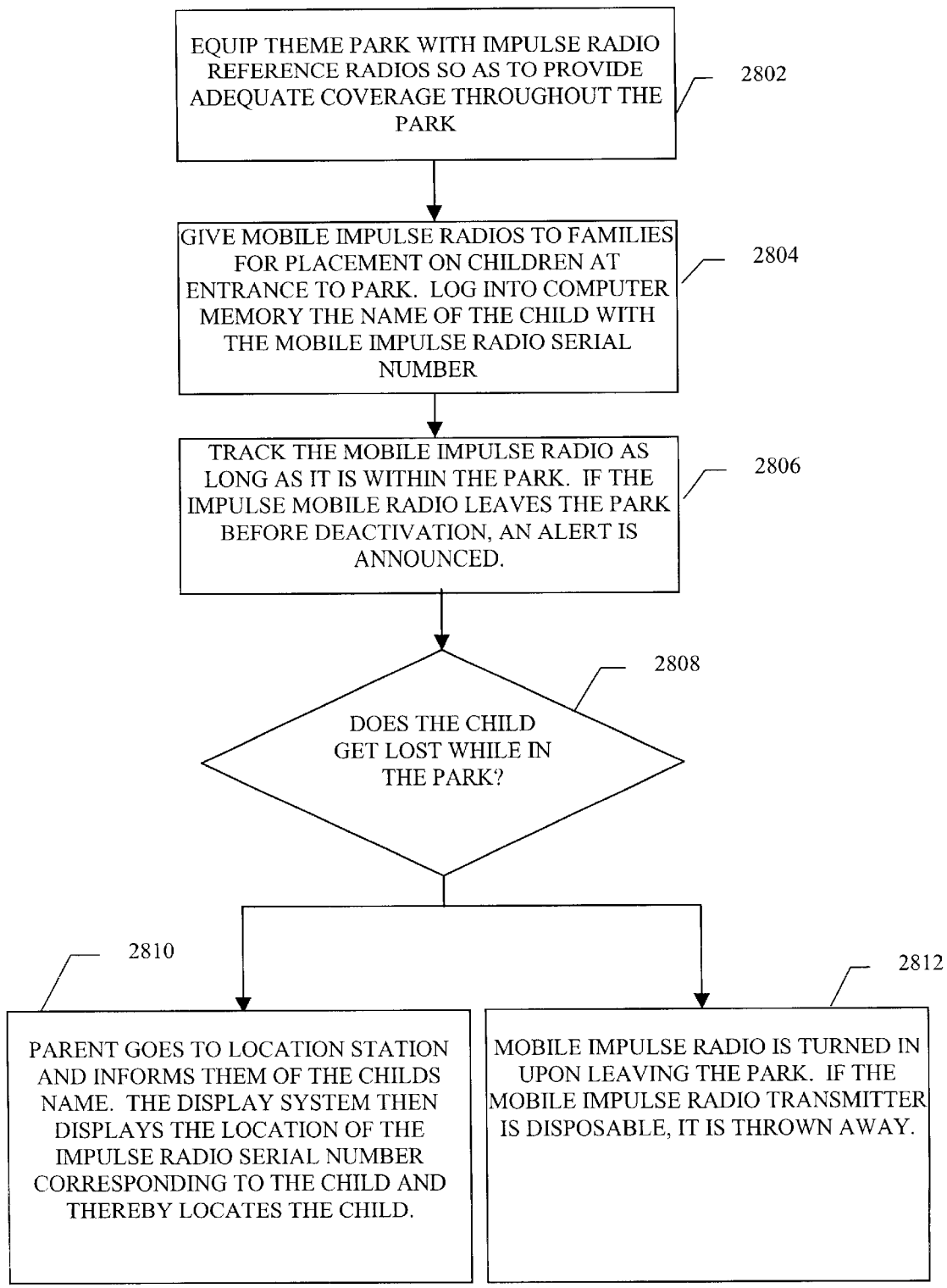
FIG. 28 is a flow chart of the process involved with the method of locating the position of a lost child in a theme park that is equipped with a system and method for position location using impulse radio.

FIG. 28 is flow chart of the process of child location of FIG. 27. Although the process herein is specific to a theme park, the process can also be employed in any area that can be bound by impulse radio reference radios either alone or in conjunction with other positioning systems such as GPS. The first step is to equip the theme park with reference impulse radios 2802. In this embodiment the radios are fixed and the positioning of them is contingent of the RF propagation environment of each area of the theme park. For example, if there is an area densely populated with trees or metal buildings, placement of the reference impulse radios would be closer together. Further, setting the integration amount of the pulses would be done based on the RF propagation environment and the information required. If it is a highly cluttered RF environment, larger integration per data bit is required. The method of accomplishing this is articulated in the patents incorporated herein by reference.

In step 2804, each child entering the theme park is given a mobile impulse radio. When the child is given the radio their name is associated with the serial number of the mobile impulse radio they are given. The parents or guardians can place the transmitter on the child directly, in a stroller, in a stuffed bear given to the child as they enter or any other method as desired. Once the mobile impulse radio has been given to the child, it is activated and begins communication with the reference impulse radios, thereby keeping track of the position of the child at all time within the park 2806. For privacy concerns and issues of capacity, the display portion of the child's tracking can be set so as not to activate until a report has been received that the child is missing or if they are no longer in the coverage area. It is noted that the mobile impulse radio is not required to be in communication with all reference impulse radios simultaneously, as long as it is in communication with at least one of the reference impulse radios, positioning can be determined.

In step 2808, a determination is made if the child is lost in the park or has left the park. When the system notices that the child's mobile impulse radio is no longer in communication with the reference impulse radios, an alert is given and last known position is displayed. The theme park can at that time take actions deemed appropriate. If the parent loses the child in step 2810 they can immediately go to a location station and inform the attendants of the child's name. Upon entry of the name into the database, the position of the mobile impulse radio is given and thus the corresponding child's location. The mobile impulse radio can be designed to be very inexpensive and therefore be thrown away after use. In step 2812, if no lost child condition exists, then the parents or guardians return the mobile impulse radio to the theme park attendants, whereafter the transmission is deactivated and removed from the tracking system and thrown away or batteries recharged for subsequent use.

While the above system assumes the mobile impulse radio position is of concern to other than the person or object with which it is associated, it may be the case that the person or object associated with the mobile impulse radio is concerned with its/their location. This can be accomplished readily by implementation of one of the architectures herein articulated.

Figure 29:
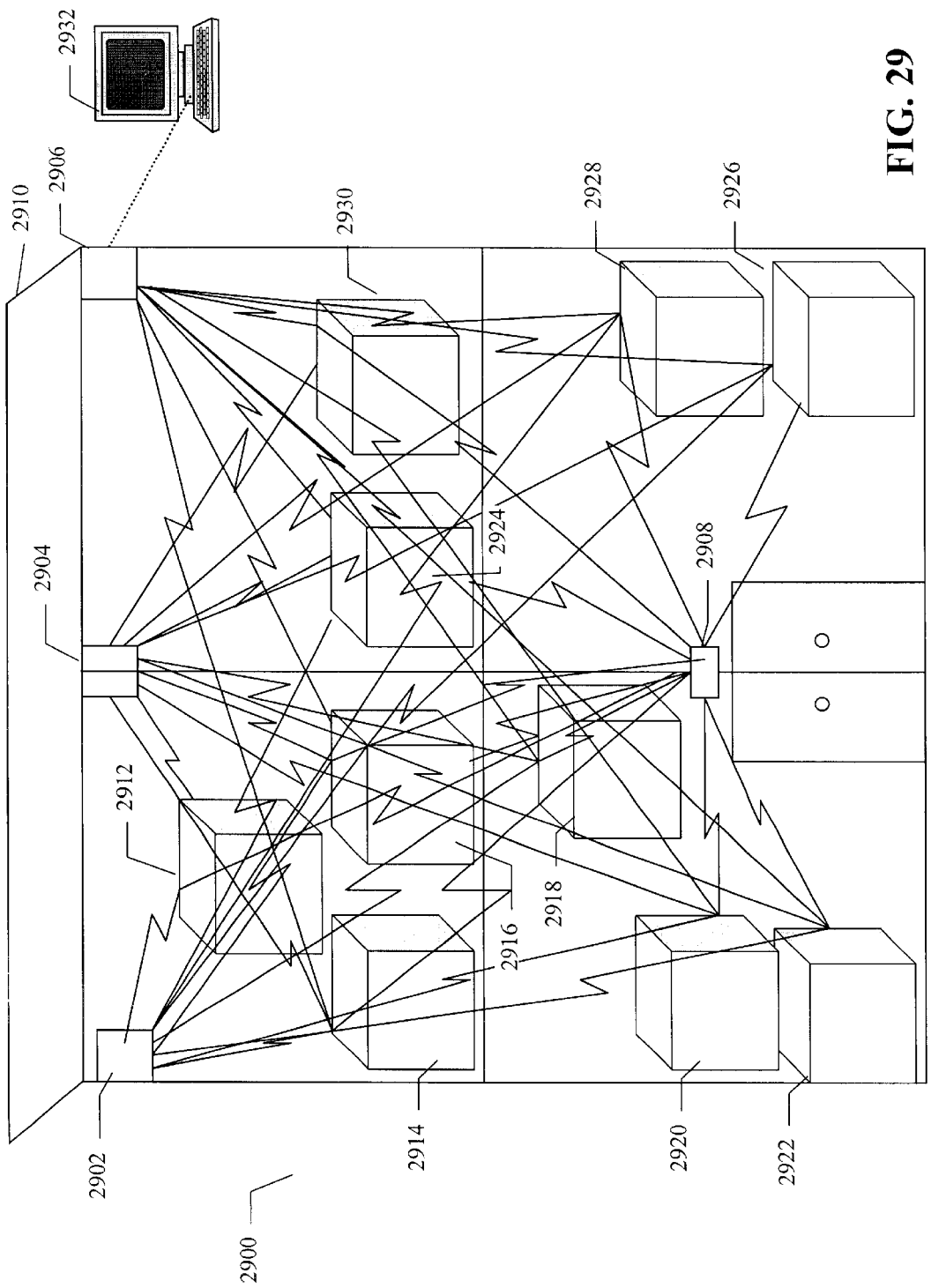
FIG. 29 illustrates the impulse radio fixed positioning system wherein the location of cargo in a warehouse is located.
Figure 30:
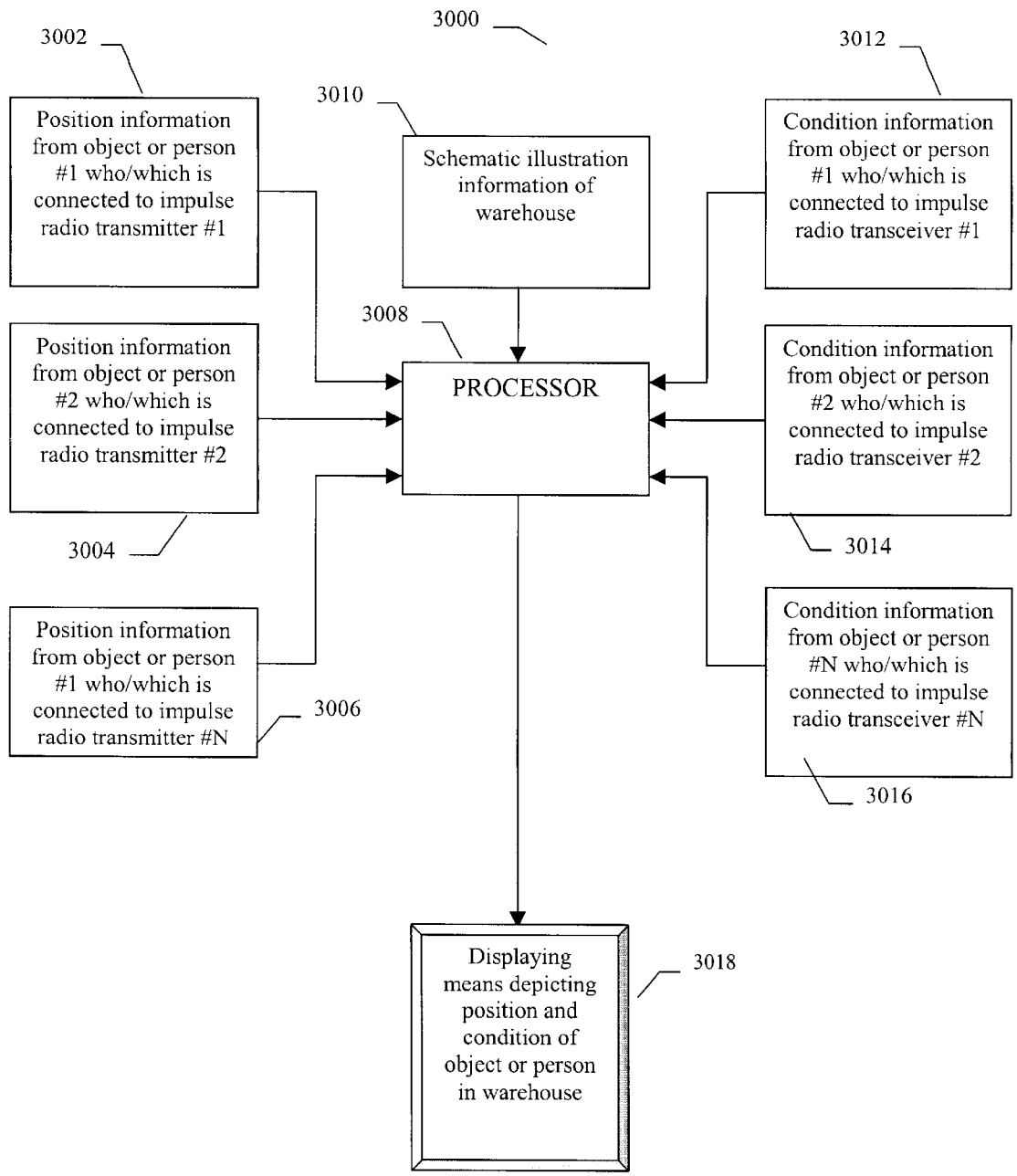
FIG. 30 is a block diagram illustrating the components in the impulse radio fixed positioning system and method as used in the cargo and warehouse example.

FIG. 29 illustrates the impulse radio position locating system and method in a warehouse environment 2900. In a warehouse, it is very important many times to know exactly where various cargo and pallets of things are stored. Further, the multipath effects in a warehouse can be very pronounced and therefore ideal for impulse radio advantages. Since items may be stored for long periods of time and the synching of the reference impulse radios 2902, 2904, 2906 and 2908 can easily be accomplished via wired or wireless means the architecture of FIG. 14B would be effective. In FIG. 29 each item stored 2912–2930 is associated with an impulse radio transmitter. Again, the impulse radio is a transmitter because long battery life is desired and the item in this case is assumed not to be concerned with where it is located. In communication with reference impulse radio 2906 is a computer 2932. An overlay of the warehouse is located in the computers memory along with the relative position of the reference radios and thereby can display to the user exactly which item is where in the warehouse.

While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements which embody the spirit and scope of the present invention.

What is claimed is:

1. System for person or object position location utilizing Impulse Radio, comprising:
    a plurality of reference impulse radios;
    at least one mobile impulse radio in communication with available said plurality of reference impulse radios, said communication providing position information of said mobile impulse radio relative to said plurality of said reference impulse radios,
    wherein said plurality of reference impulse radios are transceivers and in duplex communication with each other and said at least one mobile impulse radio is an at least one impulse radio transceiver in duplex communication with said plurality of said reference impulse radios or with another at least one mobile impulse radio.

2. The system for person or object position location utilizing Impulse Radio of claim 1, further comprising a display means, said display means displaying the position of said at least one mobile impulse radio relative to said plurality of said reference impulse radios.

3. System for person or object position location utilizing Impulse Radio, comprising:
    a plurality of reference impulse radios;
    at least one mobile impulse radio in communication with available said plurality of reference impulse radios, said communication providing position information of said mobile impulse radio relative to said plurality of said reference impulse radios,
    wherein said plurality of reference impulse radios are transceivers and not in communication with each other and said at least one mobile impulse radio is an at least one impulse radio transceiver in duplex communication with each reference impulse radio available.

4. System for person or object position location utilizing Impulse Radio, comprising:

a plurality of reference impulse radios;

at least one mobile impulse radio in communication with available said plurality of reference impulse radios, said communication providing position information of said mobile impulse radio relative to said plurality of said reference impulse radios, wherein said plurality of reference impulse radios are impulse radio transceivers in duplex communication with each other and said at least one mobile impulse radio is at least one impulse radio receiver receiving simplex communications from each reference impulse radio available.

5. System for person or object position location utilizing Impulse Radio, comprising:

a plurality of reference impulse radios;

at least one mobile impulse radio in communication with available said plurality of reference impulse radios, said communication providing position information of said mobile impulse radio relative to said plurality of said reference impulse radios, wherein said plurality of reference impulse radios are impulse radio transceivers in duplex communication with each other and said at least one mobile impulse radio is an at least one impulse radio transmitter transmitting simplex communications to each reference impulse radio available.

6. System for person or object position location utilizing Impulse Radio, comprising:

a plurality of reference impulse radios;

at least one mobile impulse radio in communication with available said plurality of reference impulse radios, said communication providing position information of said mobile impulse radio relative to said plurality of said reference impulse radios, wherein said plurality of reference impulse radios are impulse radio transceivers in duplex communication with each other and said at least one mobile impulse radio is an at least one impulse radio transceiver transmitting duplex communications to each reference impulse radio available.

7. System for person or object position location utilizing Impulse Radio, comprising:

a plurality of reference impulse radios;

at least one mobile impulse radio in communication with available said plurality of reference impulse radios, said communication providing position information of said mobile impulse radio relative to said plurality of said reference impulse radios, wherein said plurality of reference impulse radios are impulse radio transceivers in duplex communication with each other and said at least one mobile impulse radio is an at least one impulse radio receiver receiving simplex communications from each reference impulse radio available.

8. System for person or object position location utilizing Impulse Radio, comprising:

a plurality of reference impulse radios;

at least one mobile impulse radio in communication with available said plurality of reference impulse radios, said communication providing position information of said mobile impulse radio relative to said plurality of said reference impulse radios, wherein said plurality of reference impulse radios are impulse radio transceivers in duplex communication with each other and said at least one mobile impulse radio is at least two impulse radio receivers receiving simplex communications from distinct reference impulse radios.

9. System for person or object position location utilizing Impulse Radio, comprising:

a plurality of reference impulse radios;

at least one mobile impulse radio in communication with available said plurality of reference impulse radios, said communication providing position information of said mobile impulse radio relative to said plurality of said reference impulse radios, wherein said plurality of reference impulse radios are impulse radio transceivers in duplex communication with each other and said at least one mobile impulse radio is a combination of mobile impulse radio transceivers, transmitters or receivers in simplex or duplex communication with any available said reference impulse radios as their transmission abilities dictate.

10. System for person or object position location utilizing Impulse Radio, comprising:

a plurality of reference impulse radios;

at least one mobile impulse radio in communication with available said plurality of reference impulse radios, said communication providing position information of said mobile impulse radio relative to said plurality of said reference impulse radios, wherein said plurality of reference impulse radios are impulse radio transceivers in duplex communication with each other and using steerable null antennae and said at least one mobile impulse radio is an at least one impulse radio transceiver transmitting duplex communications to each reference impulse radio available.

11. System for person or object position location utilizing Impulse Radio, comprising:

a plurality of reference impulse radios;

at least one mobile impulse radio in communication with available said plurality of reference impulse radios, said communication providing position information of said mobile impulse radio relative to said plurality of said reference impulse radios, wherein said plurality of reference impulse radios are impulse radio transceivers in duplex communication with each other and said at least one mobile impulse radio is an at least one impulse radio transceiver using steerable null antennae to transmit duplex communications to each reference impulse radio available.

12. System for person or object position location utilizing Impulse Radio, comprising:

a plurality of reference impulse radios;

at least one mobile impulse radio in communication with available said plurality of reference impulse radios, said communication providing position information of said mobile impulse radio relative to said plurality of said reference impulse radios, wherein said plurality of reference impulse radios are impulse radio transceivers in duplex communication with each other and using difference antennae and said at least one mobile impulse radio is an at least one impulse radio transceiver transmitting duplex communications to each reference impulse radio available.

13. System for person or object position location utilizing Impulse Radio, comprising:
   a plurality of reference impulse radios;
   at least one mobile impulse radio in communication with available said plurality of reference impulse radios, said communication providing position information of said mobile impulse radio relative to said plurality of said reference impulse radios,
   wherein said plurality of reference impulse radios are impulse radio transceivers in duplex communication with each other and said at least one mobile impulse radio is an at least one impulse radio transceiver using difference antennae to transmit duplex communications to each reference impulse radio available.

14. System for person or object position location utilizing Impulse Radio, comprising:
   a plurality of reference impulse radios;
   at least one mobile impulse radio in communication with available said plurality of reference impulse radios, said communication providing position information of said mobile impulse radio relative to said plurality of said reference impulse radios,
   wherein said plurality of reference impulse radios are impulse radio transceivers in duplex communication with each other and using directional antennae and said at least one mobile impulse radio is an at least one impulse radio transceiver transmitting duplex communications to each reference impulse radio available.

15. System for person or object position location utilizing Impulse Radio, comprising:
   a plurality of reference impulse radios;
   at least one mobile impulse radio in communication with available said plurality of reference impulse radios, said communication providing position information of said mobile impulse radio relative to said plurality of said reference impulse radios,
   wherein said plurality of reference impulse radios are impulse radio transceivers in duplex communication with each other and said at least one mobile impulse radio is an at least one impulse radio transceiver using directional antennae to transmit duplex communications to each reference impulse radio available.

16. System for person or object position location utilizing Impulse Radio, comprising:
   a plurality of reference impulse radios;
   at least one mobile impulse radio in communication with available said plurality of reference impulse radios, said communication providing position information of said mobile impulse radio relative to said plurality of said reference impulse radios,
   wherein said plurality of reference impulse radios are impulse radio transceivers in duplex communication with each other and said at least one mobile impulse radio is an at least one impulse radio transceiver transmitting duplex communications to each reference impulse radio available and determining range by measuring signal amplitude in said communications.

17. The system for person or object position location utilizing Impulse Radio of claim 16, wherein said signal amplitude is measured by predetermining an amplitude for a given range and comparing the received amplitude in a table look-up to the predetermined amplitude.

18. The system for person or object position location utilizing Impulse Radio of claim 1, further comprising a Global Positioning System interfaced with said reference impulse radios, wherein differential GPS corrections and precise impulse radio positioning is provided.

19. A method of person or object location utilizing impulse radio, comprising:
   placing a plurality of reference impulse radios in an area wherein the position of an object or person is to be determined;
   associating a mobile impulse radio with said person or object whose position is to be determined;
   communicating between said mobile impulse radio and said plurality of reference impulse radios, said communication enabling position determination,
   wherein one of said reference impulse radios is placed non-coplaner with other reference impulse radios, said placement providing for three dimensional position location.

20. The method of person or object location utilizing impulse radio, of claim 19, wherein said plurality of reference impulse radios are fixed and communicating via wired means.

21. The method of person or object location utilizing impulse radio, of claim 19, wherein said plurality of reference impulse radios are fixed and communicating via impulse radio means.

22. The method of person or object location utilizing impulse radio of claim 19, wherein said plurality of said reference impulse radios are portable and communicating via impulse radio means.

23. The method of person or object location utilizing impulse radio of claim 19, further comprising displaying said position information.

24. The method of person or object location utilizing impulse radio, of claim 23, wherein said display includes a graphical representation of the area wherein location is occurring and wherein said position is depicted on said graphical representation.

25. The method of person or object location utilizing impulse radio, of claim 19, wherein said communication between said mobile impulse radio and said plurality of reference impulse radios includes information relating to the person or object whose location is being determined.

26. The method of person or object location utilizing impulse radio, of claim 19, wherein said communication between said mobile impulse radio and said plurality of reference impulse radios includes information concerning the surroundings of the person or object whose position is being determined.

27. The method of person or object location utilizing impulse radio, of claim 19, further comprising the step of establishing duplex communication among available reference radios.

28. The method of person or object location utilizing impulse radio of claim 19, wherein said communication between said mobile impulse radio and said plurality of reference impulse radios is a simplex transmission from said at least one mobile impulse radio to said impulse radio reference radios.

29. The method of person or object location utilizing impulse radio of claim 19, wherein said communication between said mobile impulse radio and said plurality of reference impulse radios is a simplex transmission from said impulse radio reference radios to said at least one mobile impulse radio.

30. The method of person or object location utilizing impulse radio of claim 19, wherein said communication between said mobile impulse radio and said plurality of reference impulse radios is a duplex transmission from said impulse radio reference radios to said at least one mobile impulse radio.

* * * * *